United States Patent
Ishikawa et al.

(10) Patent No.: US 11,235,824 B2
(45) Date of Patent: Feb. 1, 2022

(54) WORK VEHICLE

(71) Applicant: Kubota Corporation, Osaka (JP)

(72) Inventors: Junichi Ishikawa, Sakai (JP); Minoru Hiraoka, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/761,293

(22) PCT Filed: Dec. 21, 2018

(86) PCT No.: PCT/JP2018/047285
§ 371 (c)(1),
(2) Date: May 4, 2020

(87) PCT Pub. No.: WO2019/131522
PCT Pub. Date: Jul. 4, 2019

(65) Prior Publication Data
US 2021/0188378 A1    Jun. 24, 2021

(30) Foreign Application Priority Data

Dec. 25, 2017  (JP) .............................. JP2017-248207
Dec. 25, 2017  (JP) .............................. JP2017-248209

(51) Int. Cl.
*B62D 61/12*    (2006.01)
*B60G 3/14*    (2006.01)
(Continued)

(52) U.S. Cl.
CPC ............... *B62D 61/12* (2013.01); *B60G 3/14* (2013.01); *B60G 17/00* (2013.01); *B60K 7/0015* (2013.01);
(Continued)

(58) Field of Classification Search
CPC ...... B62D 61/12; B62D 5/12; B62D 49/0678; B60G 3/14; B60G 17/00; B60G 2500/40;
(Continued)

(56) References Cited

U.S. PATENT DOCUMENTS 3,351,037 A * 11/1967 Meili ...................... B60K 17/30
440/12.66
3,397,898 A * 8/1968 Denney .................. B62D 61/12
280/755
(Continued)

FOREIGN PATENT DOCUMENTS

DE    3843532 A1 * 1/1990 ........... B62D 55/062
FR    2609262 A1 * 7/1988 ............. B62D 61/12
(Continued)

*Primary Examiner* — James A English
*Assistant Examiner* — Kurtis Nielson
(74) *Attorney, Agent, or Firm* — The Webb Law Firm

(57) ABSTRACT

A work vehicle includes a plurality of traveling devices driven for traveling, a plurality of articulated link mechanisms having a plurality of links pivotally coupled to each other to provide two or more joints and configured to independently support the traveling devices to a vehicle body with allowing lifting/lowering of the traveling devices independently relative to the vehicle body, and a plurality of hydraulic cylinders capable of changing respective postures of the plurality of links included in the articulated link mechanisms. A first link located at a position nearest the vehicle body is supported to be pivotable about a body side coupling portion. A first hydraulic cylinder for operating the first link has its cylinder tube side pivotally coupled to a coupled portion on the side of the vehicle body and has its piston rod side pivotally coupled to a coupled portion on the side of the first link.

7 Claims, 17 Drawing Sheets

(51) Int. Cl.
  *B60G 17/00* (2006.01)
  *B60K 7/00* (2006.01)
  *B62D 5/12* (2006.01)
  *B25J 9/16* (2006.01)

(52) U.S. Cl.
  CPC ............... *B62D 5/12* (2013.01); *B25J 9/1669* (2013.01); *B60G 2200/18* (2013.01); *B60G 2204/62* (2013.01); *B60G 2300/402* (2013.01); *B60G 2500/30* (2013.01); *B60G 2500/40* (2013.01); *B60G 2800/24* (2013.01)

(58) Field of Classification Search
  CPC .......... B60G 2300/402; B60G 2500/30; B60G 2200/18; B60G 2300/08; B60K 7/0015
  See application file for complete search history.

(56) References Cited

U.S. PATENT DOCUMENTS

| | | | | |
|---|---|---|---|---|
| 3,642,085 | A * | 2/1972 | Bird | B62D 61/12 180/41 |
| 4,768,601 | A * | 9/1988 | Okano | B62D 55/065 180/24.07 |
| 5,655,615 | A * | 8/1997 | Mick | B62D 49/08 180/24.02 |
| 2004/0036244 | A1* | 2/2004 | Kotulla | B60G 21/073 280/124.106 |
| 2008/0314656 | A1* | 12/2008 | Brehob | B62D 57/00 180/7.1 |
| 2014/0025245 | A1* | 1/2014 | Fanourakis | B62D 53/06 701/22 |
| 2015/0290994 | A1* | 10/2015 | Dames | B60G 7/001 280/830 |
| 2015/0291233 | A1* | 10/2015 | Dames | B60B 35/1027 280/638 |
| 2016/0096547 | A1* | 4/2016 | Dames | B62D 49/0678 280/86.758 |
| 2020/0017152 | A1* | 1/2020 | Ishikawa | B62D 61/12 |
| 2020/0062324 | A1* | 2/2020 | Ishikawa | B60G 3/20 |
| 2020/0276877 | A1* | 9/2020 | Gao | B62D 7/1581 |
| 2020/0354003 | A1* | 11/2020 | Ishikawa | B60K 7/0007 |

FOREIGN PATENT DOCUMENTS

| | | |
|---|---|---|
| JP | S48076616 U1 | 9/1973 |
| JP | H09142347 A | 6/1997 |
| JP | 2008213732 A | 9/2008 |
| JP | 2009254310 A | 11/2009 |
| JP | 2016113756 A | 6/2016 |

* cited by examiner

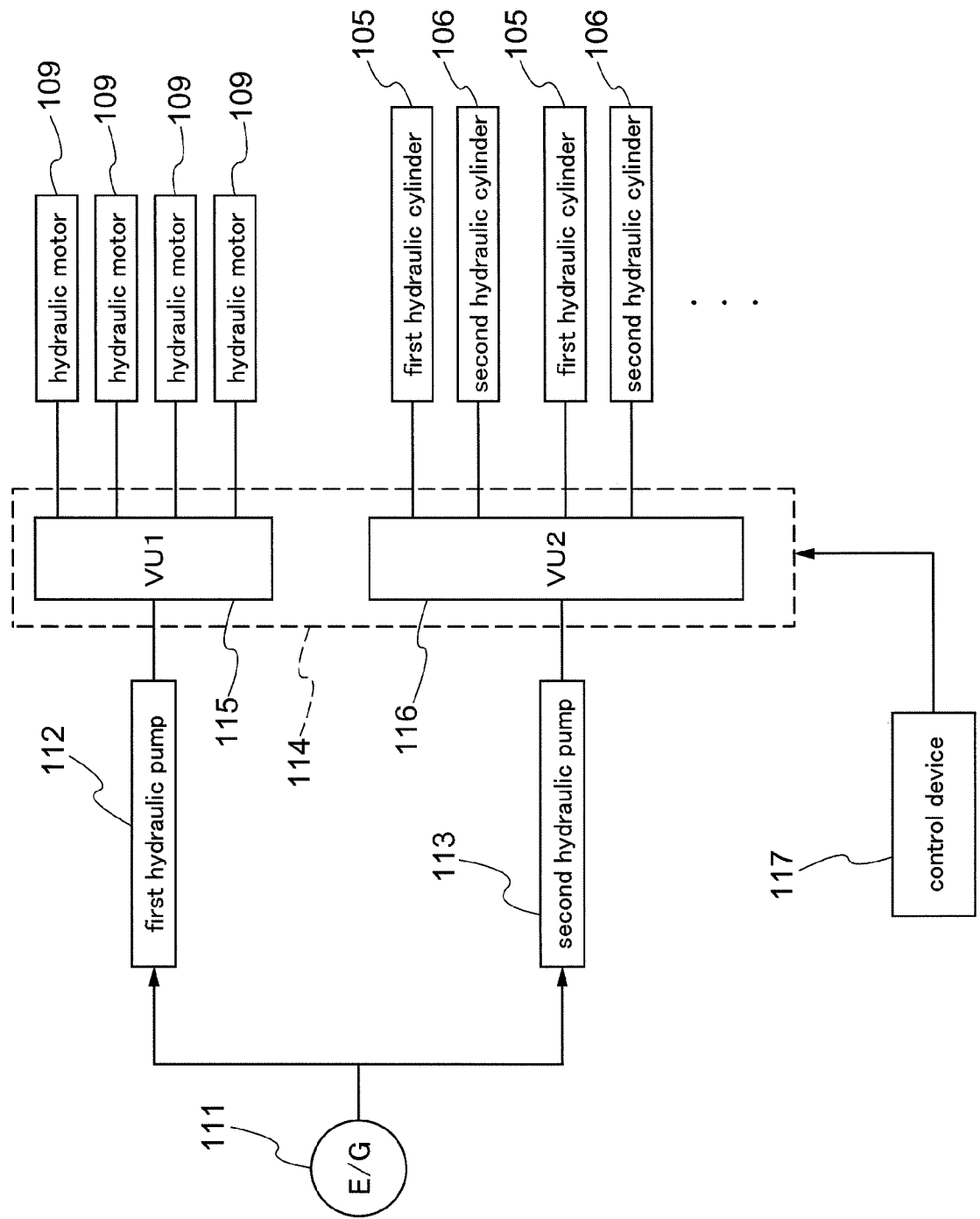

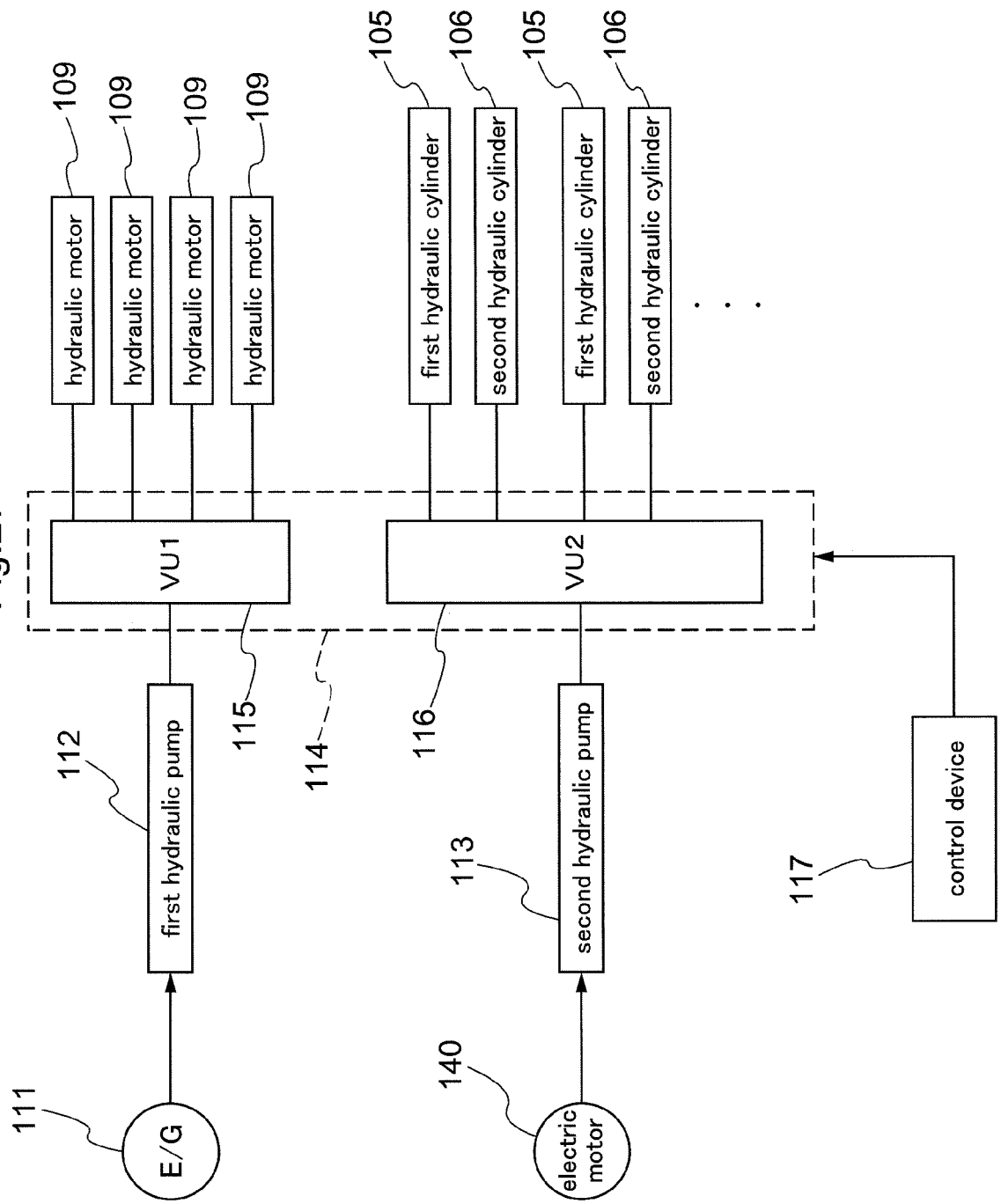

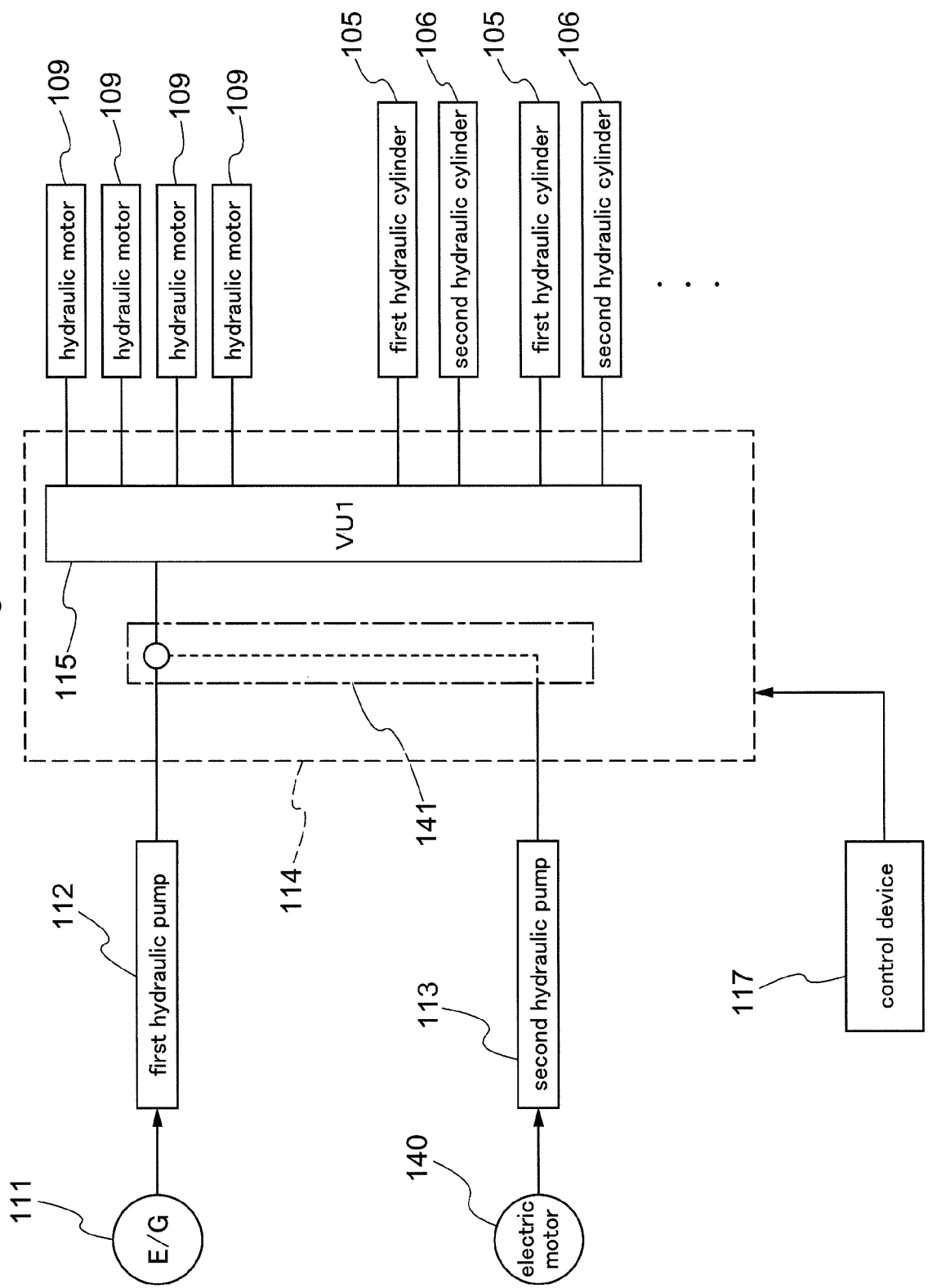

WORK VEHICLE

CROSS-REFERENCE TO RELATED APPLICATIONS

This application is the United States national phase of International Application No. PCT/JP2018/047285 filed Dec. 21, 2018, and claims priority to Japanese Patent Application Nos. 2017-248207 and 2017-248209, filed Dec. 25, 2017, the disclosures of which are hereby incorporated by reference in their entirety.

TECHNICAL FIELD

The present invention relates to a work vehicle suitable for traveling on a highly rugged road surface.

BACKGROUND ART

Conventionally, there is known an arrangement in which each one of four traveling wheels is supported to a vehicle body via a link mechanism having two joints and configured to be bendable/stretchable, the link mechanism incorporates an electric motor, a speed reduction mechanism, etc. and the link mechanism can be driven to be bent/stretched under a drive force of the electric motor (see Patent Literature 1 for instance).

PRIOR-ART DOCUMENT(S)

Patent Literature(s)

Patent Literature 1: Japanese Unexamined Patent Application Publication "Heisei" 9-1423347 (JP H09-142347A).

SUMMARY OF THE INVENTION

Objects to be Resolved by the Invention

[Object 1]
The wheel support arrangement according to the above-described conventional configuration is intended to enable traveling with maintaining the vehicle body under an appropriate posture even in the presence of unevenness on the traveling road surface through bending/stretching of the link mechanism. Then, it is conceivable to apply such wheel support arrangement to an agricultural work vehicle that travels in a work site having unevenness on the traveling road surface.

However, in case the application of the above-described conventional arrangement to an agricultural work vehicle is contemplated, there will occur a problem as follows. Namely, in the case of an agricultural work vehicle, in the vicinity of the work vehicle, a large amount of fine dust such as floating dust generated from an agricultural produce in association with traveling can occur, and adhesion of water too can occur due to e.g. rainwater, morning mist, etc. With the above-described conventional arrangement, the link mechanisms for supporting traveling wheels are driven to be bent/stretched by an electric motor. Thus, if such fine dust, water or the like enters the link mechanisms, this can lead to development of a trouble in the electric motor, an electric circuit system, etc.

Thus, there has been a need for a work vehicle that can maintain an appropriate posture of a vehicle body even in a highly rugged work site in a work environment having a high risk of intrusion of fine dust, water, etc.

[Object 2]
Further, in the wheel support arrangement according to the above-described conventional configuration, in order to resolve the above-described inconvenience, it is conceivable to employ a hydraulic cylinder instead of the electric motor, as a driving device employed for posture changing operation of the link mechanism. Further, with this type of work vehicle, in addition to the hydraulic cylinder for posture changing operation of the link mechanism, a drive device for driving the traveling devices is also needed. However, since the traveling devices are supported to the vehicle body via posture-changeable link mechanisms, if it is arranged to supply the driving force from the vehicle body side via a mechanical transmission mechanism such as a gear, a chain, or the like, the arrangement will become complicated. Then, it is conceivable to employ a hydraulic motor, etc. for driving of the traveling devices also.

And, in the case of an arrangement having a plurality of such hydraulic driving devices, it is conceivable e.g. to arrange such that by driving a hydraulic pump by a drive source such as an engine, etc., work oil is supplied to the plurality of hydraulic drive devices. With this arrangement, in the case of traveling in a rugged work site, the hydraulic motor for traveling driving and the hydraulic cylinder for posture changing can be operated simultaneously.

With this type of work vehicle, a large driving load does not occur as is the case with a tractor and the vehicle body is formed compact, so the work vehicle is often used mainly for such application of carrying out a utility work involving a relatively light load. So, in many cases, a small engine will be mounted on the work vehicle. In case such small engine is mounted as above, in the event of simultaneous operation of the traveling driving hydraulic motor and the posture changing hydraulic cylinder, a large amount of work will be used for the hydraulic motor, so that there occurs shortage in the pressure oil available for the posture changing hydraulic cylinder. Consequently, the posture of the vehicle body may become unstable.

Thus, there has been a need for a work vehicle that can maintain an appropriate posture of a vehicle body even in a highly rugged work site in a work environment having a high risk of intrusion of fine dust, water, etc.

Solution to the Object

[1] Solution corresponding to [Object 1] is as follows.
A work vehicle comprising:
a vehicle body;
a plurality of traveling devices driven for traveling;
a plurality of articulated link mechanisms having a plurality of links pivotally coupled to each other to provide two or more joints and configured to independently support the traveling devices to a vehicle body with allowing lifting/lowering of the traveling devices independently relative to the vehicle body; and
a plurality of hydraulic cylinders capable of changing respective postures of the plurality of links included in the articulated link mechanisms;
wherein a first link, located at a position closest to the vehicle body in the plurality of links, is supported to be pivotable about a body side coupling portion;
wherein a first hydraulic cylinder included in the plurality of hydraulic cylinders and used for operating the first link is configured to pivotally operate the first link, in association with an expansion/contraction operation thereof associated with feeding of work oil thereto from an oil source included in the vehicle body; and wherein a cylinder tube side of the first hydraulic cylinder is pivotally coupled to a coupled portion on the side of the vehicle body, and a piston rod side of the first hydraulic cylinder is pivotally coupled to a coupled portion on the side of the first link.

With the present invention described above, to the vehicle body, a plurality of traveling devices are supported via the respective bending link mechanisms to be pivotally lifted up/down independently. As the bending link mechanisms have their postures changed by the plurality of hydraulic cylinders, the height (relative height) of each one of the plurality of traveling devices relative to the vehicle body can be changed. Namely, the relative heights of the traveling devices provided on the front and rear sides on the right and left opposed sides of the vehicle body can be changed. As a result, even in the case of traveling on an uneven ground surface, the vehicle can travel with maintaining the vehicle body under an appropriate posture by being supported in contact with the ground surface in a stable manner by the plurality of traveling devices. Also, the hydraulic cylinders will unlikely suffer malfunction or the like due to adverse influence, even in the event of intrusion of fine dust, water or the like.

And, the first hydraulic cylinder for operating the first link disposed on the vehicle body side has its cylinder tube pivotally coupled to the coupled side on the side of the vehicle body and has its piston rod pivotally coupled to the coupled side on the side of the first link. And, as work oil fed from the oil source is fed via a work oil feeding tube such as a hydraulic hose to operate the first hydraulic cylinder for its expansion/contraction, the first link is pivoted about the vehicle body side coupling portion.

Feeding and discharging of work oil to/from the first hydraulic cylinder are effected via the hydraulic hose connected to the cylinder tube and with this feeding/discharging of work oil, the piston rod is slidably moved for cylinder expansion/contraction. As the cylinder tube is pivotally coupled to the coupled portion on the vehicle body side, the amount of movement of the cylinder tube is small even with the expansion/contraction operation. As a result, the work oil feeding tube such as the hydraulic hose connected to the cylinder tube will less likely suffer damage from being entrapped in the bending link mechanism for instance.

Therefore, it has become possible to provide a work vehicle that can travel with maintaining the vehicle body under an appropriate posture even in a highly rugged work site and with less possibility of damage of its components in a work environment having high possibility of intrusion of fine dust, water or the like to the inside of the vehicle body.

In the present invention, preferably, there are provided a plurality of turning mechanisms configured to support the plurality of articulated link mechanisms respectively to the vehicle body with allowing changing of the respective postures thereof about a vertical axis.

With the above-described arrangement, when the vehicle body is to make a turn to either the left or right side, the posture of the articulation mechanism will have its posture changed about the vertical axis, whereby the right/left orientation of the traveling device can be changed. As a result, the vehicle can travel to make a turn with no excessive lateral force being applied to the traveling device.

In the present invention, preferably:
the articulated link mechanism is disposed on more laterally outer side than a laterally outer end of the vehicle body;

as seen in a plan view, the turning mechanism is disposed between the vehicle body and the articulated link mechanism; and adjacent the turning mechanism, there is provided a feeding pipe holding portion of holding in position a work oil feeding pipe for feeding the work oil from the oil source to the plurality of hydraulic cylinders.

With the above-described arrangement, the traveling devices supported by the articulated link mechanisms are disposed on more laterally outer side than the laterally outer end of the vehicle body, so that they can be supported under a stable state with a wide ground-contacting distance in the lateral direction. And, since the turning mechanism is disposed between the vehicle body and the articulated link mechanism as seen in a plan view, with a turning operation, the traveling device can be set to a posture widely spread to further laterally outer side, whereby further stabilization of the posture of the ground-contacting posture is made possible.

In this way, in the case of the above-described arrangement in which the articulated link mechanism is posture-changeable about a vertical axis via the turning mechanism, in association with a turning operation, a work oil feeding tube such as a hydraulic hose that connects the oil source to the plurality of hydraulic cylinders can be pivotally displaced. However, since the intermediate portion of the work oil feeding tube such as a hydraulic hose has its position held by the feeding pipe holding portion, there will be less possibility of damage to the work oil feeding tube as being entrapped by the articulated link mechanism for instance.

[2] Solution corresponding to [Object 2] is as follows.

A work vehicle comprising:
a vehicle body;
a plurality of traveling devices driven for traveling;
a plurality of vehicle body supporting portions for supporting the plurality of traveling devices with allowing changes in height positions thereof relative to the vehicle body independently;
a plurality of hydraulic motors for driving the plurality of traveling devices respectively;
a plurality of hydraulic cylinders capable of changing postures of the plurality of vehicle body support portions respectively;
a first hydraulic pump for feeding pressure oil to the plurality of hydraulic motors; and
a second hydraulic pump for feeding pressure oil to the plurality of hydraulic cylinders.

With the present invention described above, as pressure oil is fed from the first hydraulic pump to the hydraulic motors, the traveling devices are driven, whereby the work vehicle travels. On the other hand, when pressure oil is fed from the second hydraulic pump to the plurality of hydraulic cylinders, the height positions of the traveling devices relative to the vehicle body are changed. As a result, even when a large amount of pressure oil needed for traveling is fed to the hydraulic motors, this does not affect the feeding condition of pressure oil to the hydraulic cylinders, so that posture changing operations of the vehicle body to cope with unevenness of the ground surface can be carried out in a favorable manner while traveling.

Moreover, the hydraulic motors and the hydraulic cylinders are operated by pressure oil. from the hydraulic pumps. Therefore, even if find dust, water or the like enters, this will hardly provide any adverse effect to cause a malfunction or the like.

In the present invention, preferably, the first hydraulic pump is driven by an engine, and the second hydraulic pump is driven by an electric motor.

With the above-described invention, for the hydraulic motors that require a large amount of pressure oil for driving the traveling devices, the pressure oil is fed by the first hydraulic pump which is driven by the engine. Therefore, a sufficient amount of pressure oil can be fed to the hydraulic motors. On the other hand, for the hydraulic cylinders for posture changing operations, pressure oil is fed by the first hydraulic pump which is driven by the electric motor. Therefore, when a posture changing operation is to be carried out during traveling of the work vehicle, even if e.g. a large amount of pressure oil is being fed to the hydraulic motors, this does not affect the feeding of pressure oil to the hydraulic cylinders, so there is less risk of the posture of the vehicle body being destabilized. Moreover, if a posture changing operation of the vehicle body is needed while the work vehicle stops traveling, pressure oil can be fed by driving of the electric motor while the engine is stopped. Thus, noise generation can be reduced and there can be obtained another advantage of reduction of fuel consumption amount being made possible.

In the present invention, preferably, there is provided an oil passage switching device capable of switching over between a state of pressure oil from the first hydraulic pump being fed to the hydraulic motors and a state of pressure oil from the second hydraulic pump being fed to the plurality of hydraulic motors.

With the above-described arrangement, with switchover to the state of the pressure oil from the first hydraulic pump driven by the engine being fed to the plurality of hydraulic motors, a large amount of pressure oil can be fed in a stable manner to the hydraulic motors. For instance, stable traveling is possible in the case of traveling on a rough road with much surface unevenness, the case of traveling for an extended period of time, the case of traveling at a high speed, etc.

With switchover to the state of the pressure oil from the second hydraulic pump driven by the electric motor being fed to the plurality of hydraulic motors, traveling can be driven with keeping the engine stopped. For instance, moving for traveling is possible with fine adjustment, in the case of e.g. slight change in the position of the vehicle body is desired, the case of mounting/dismounting the work vehicle on/from a man-driven vehicle or the like, etc.

In accordance with such differences of work situation, by switching the hydraulic pump to be used, the pressure oil feeding condition can be made suitable for the current work situation, thus high convenience can be obtained.

In the present invention, preferably, the lift supporting mechanism comprises an articulated link mechanism having a plurality of links are pivotally coupled to provide at least two or more joints and configured to support the vehicle body with allowing lifting/lowering of the traveling device.

With the above-described arrangement, as the traveling device is supported with using the articulated link mechanism, it is possible to extend the range of height adjustment of the traveling device relative to the vehicle body. Thus, even if significant unevenness exists on the traveling road surface, traveling is possible with maintaining the vehicle body under a posture suitable for the work.

Further and other characterizing features and advantageous effects achieved thereby will become apparent upon reading the following description with reference to the accompanying drawings.

BRIEF DESCRIPTION OF THE DRAWINGS

FIG. 26 is a hydraulic system diagram, FIG. 27 is a hydraulic system diagram of a further embodiment, and FIG. 28 is a hydraulic system diagram of a still further embodiment.

EMBODIMENTS OF THE INVENTION

First Embodiment

Figure 1:
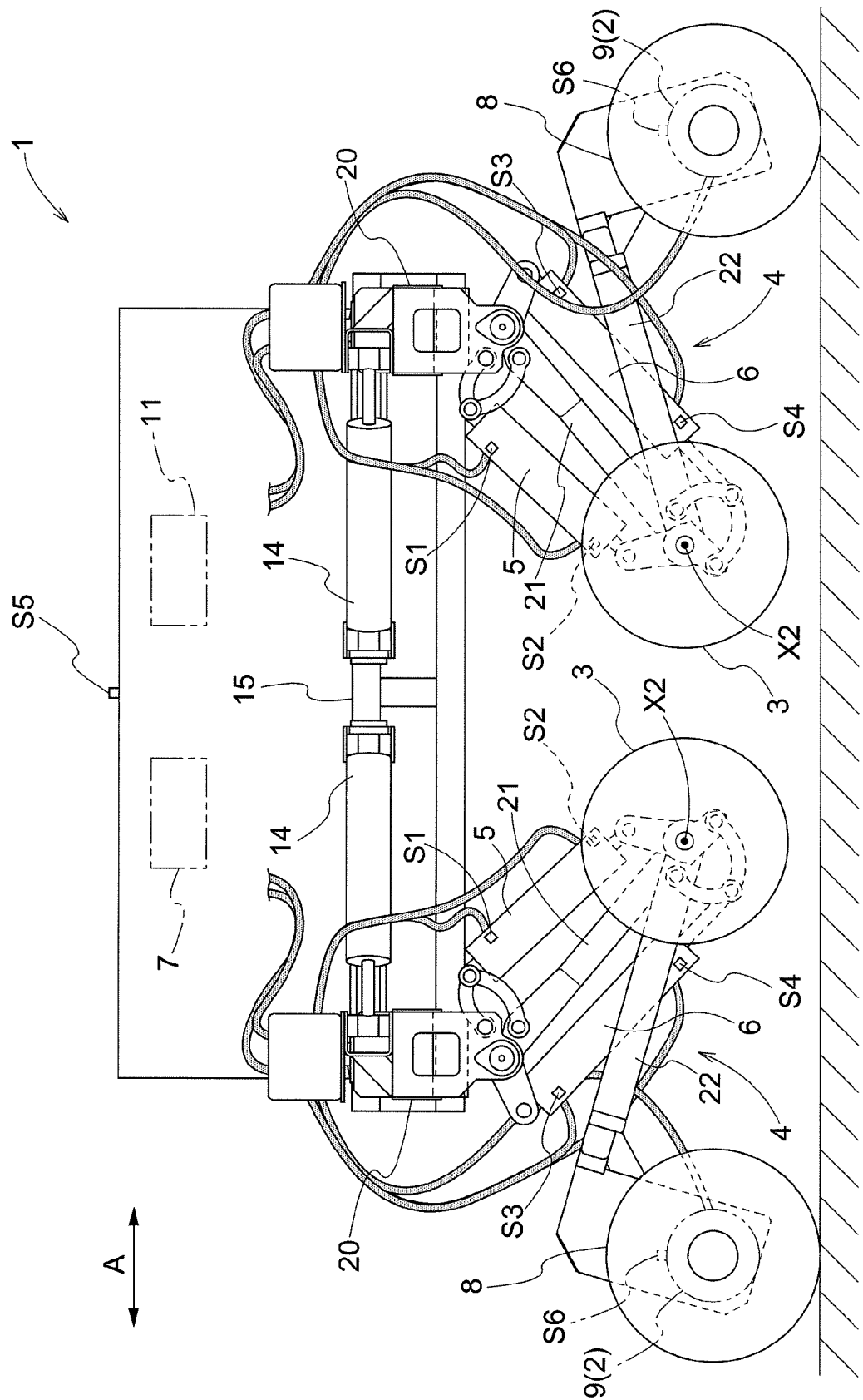
FIG. 1 is an overall side view showing a work vehicle according to a first embodiment (applied also through to FIG. 17)
Figure 2:
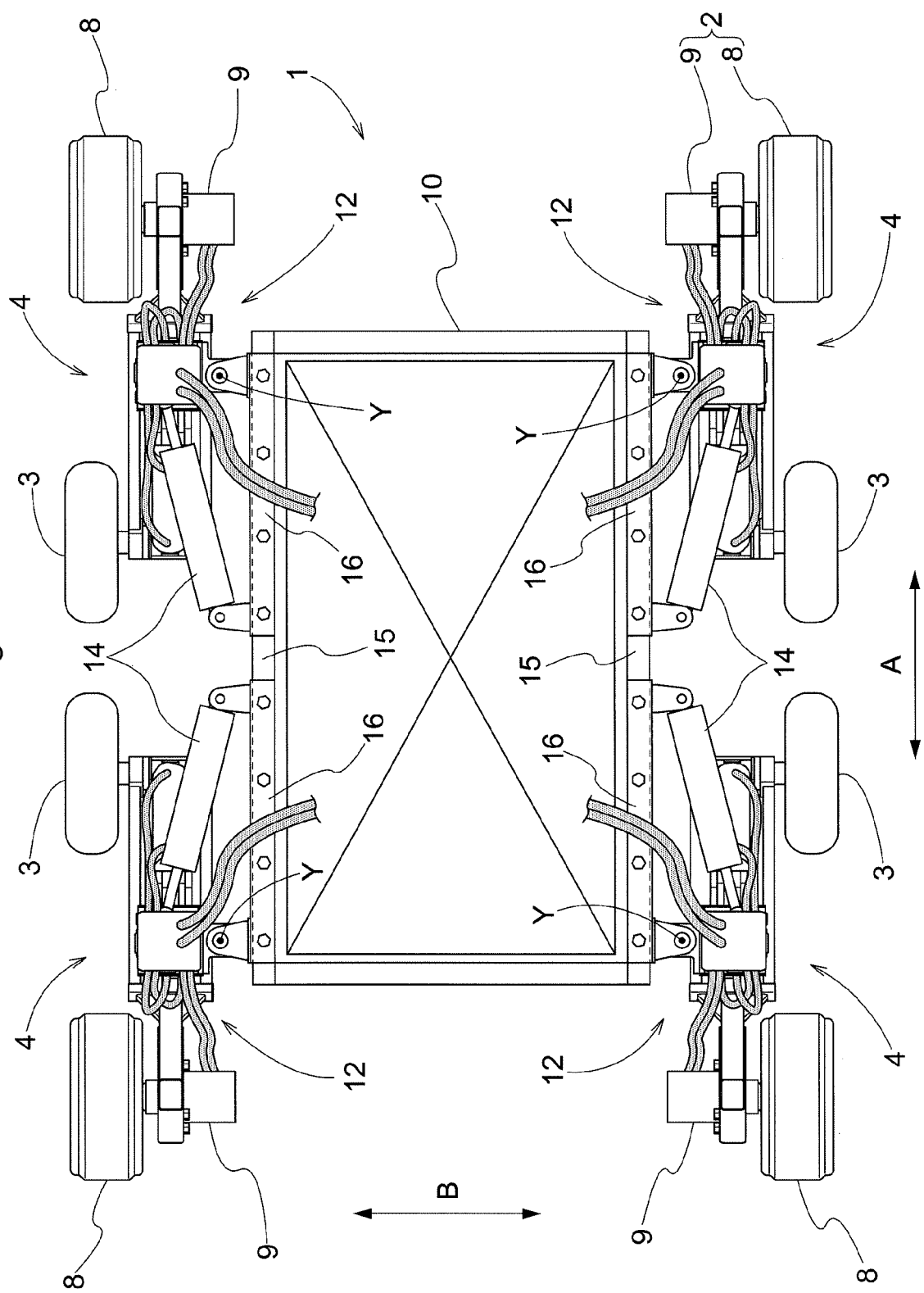
FIG. 2 is an overall plan view of a work vehicle.

As shown in FIGS. 1 and 2, a work vehicle includes a vehicle body 1 in the form of an approximately rectangular frame for supporting the entire vehicle, a plurality of ("four" in specific) traveling devices 2, a plurality of auxiliary wheels 3 provided in correspondence with the respective plurality of traveling devices 2, bending link mechanisms 4 (an example of "articulated link mechanism") as "vehicle body supporting portions" for supporting the vehicle body 1 with allowing changes of respective positions of the plurality of traveling devices 2, a plurality of hydraulic cylinders 5, 6 capable of changing postures of the respective bending link mechanisms 4, and a work oil feeding device 7 as a hydraulic (pressure oil) source for feeding work oil to the plurality of hydraulic cylinders 5, 6.

Each one of the plurality of traveling devices 2 includes a drive wheel 8 supported to be rotatable about a horizontal axis and a hydraulic motor 9 incorporated within a bearing portion of the drive wheel 8. Each traveling device 2 can rotatably drive the drive wheel 8 associated therewith by operating the hydraulic motor 9.

In this embodiment, when definition is to be made for the front/rear direction of the vehicle body, this definition is made along the vehicle body advancing direction. When definition is to be made for the right/left direction of the vehicle body, this definition is made as seen in the vehicle body advancing direction. Namely, the direction denoted with a sign (A) in FIG. 1 represents the vehicle body front/rear direction and the direction denoted with a sign (B) in FIG. 2 represents the vehicle body right/left direction.

The vehicle body 1 includes a support frame 10 in the form of a rectangular frame that surrounds the entire circumference of the vehicle body 1 and that also supports it entirely. The work oil feeding device 7 is accommodated and supported inside the vehicle body 1. Though not detailed herein, the work oil feeding device 7 includes a hydraulic pump driven by an engine and feeding work oil to the plurality of hydraulic cylinders 5 and the plurality of hydraulic motors 9, a hydraulic control unit for controlling the work oil fed from the hydraulic pump, a work oil tank, etc. and effects feeding and discharging of the work oil, adjustment of its flow rate/amount, etc.

Inside the vehicle body 1, there is mounted a control device 11 for controlling operations of the work oil feeding device 7. Control operations by the control device 11 will not be detailed herein. Briefly, however, based on instruction information inputted via an unillustrated manual input device (e.g. a remote controller, etc.) or preset and prestored instruction information, feeding states of work oil to the hydraulic cylinders 5 and the hydraulic motors 9 are controlled.

Next, a support arrangement for supporting the traveling devices 2 to the vehicle body 1 will be described.

The four traveling devices 2 are supported to the vehicle body 1 to be liftable up/down via the respective bending link mechanisms 4. Each bending link mechanism 4 is supported to the vehicle body 1 with its orientation being changeable about a vertical axis by a turning mechanism 12.

As shown in FIG. 2, the bending link mechanism 4 is supported to a support frame 10 to be pivotable about a vertical axis Y via the turning mechanism 12. The turning mechanism 12 includes a vehicle body side supporting portion 13 (see FIG. 3 and FIG. 4) which is coupled to the support frame 10 and which also pivotally supports the bending link mechanism 4; and a turning hydraulic cylinder (to be referred to as "turning cylinder" hereinafter) 14 for turning the bending link mechanism 4.

As shown in FIGS. 3 through 6, the vehicle body side supporting portion 13 includes a coupling member 16 which is engaged with a pair of upper and lower front/rear oriented frame bodies 15, in the form of angular cylinders provided at lateral portions of the support frame 10, by sandwiching the frame bodies 15 from lateral outer sides thereof and which also is to be removably bolt-connected thereto; an outer side pivot bracket 17 disposed at an outer side portion in the vehicle body front/rear direction of the coupling member 16; an inner side pivot bracket 18 disposed at an inner side portion in the vehicle body front/rear direction of the coupling member 16; and a vertically oriented pivot shaft 19 supported to the outer side pivot bracket 17, so that the vehicle body side supporting portion 13 supports the bending link mechanism 4 with allowing pivotal movements thereof about the vertical axis Y of the pivot shaft 19.

The bending link mechanism 4 includes a base end portion 20 which has its position fixed in the vertical direction and which is supported to the vehicle body side supporting portion 13 to be pivotable about the vertical axis Y; a first link 21 having one end portion thereof supported to a lower portion of the base end portion 20 to be pivotable about a horizontal axis X1; and a second link 22 having one end portion thereof supported to the other end portion of the first link 21 to be pivotable about a horizontal axis X2 and having the other end portion thereof supported to the traveling device 2. Namely, of the two links of the bending link mechanism 4, the first link 21 is disposed at a position closer to the vehicle body and supported to be pivotable about the vehicle body side coupling portion (the lower portion of the base end portion 20).

More particularly, the base end portion 20 is provided in the form of a rectangular frame as seen in a plan view; and at a position offset inward in the vehicle body lateral width direction, the base end portion 20 is supported to the outer side pivot bracket 17 of the vehicle body side supporting portion 13 to be pivotable about the vertical axis Y via the pivot shaft 19. The turning cylinder 14 has one end portion thereof pivotally coupled to the inner side pivot bracket 18 and has the other end portion thereof pivotally coupled to a portion of the base end portion 20 laterally displaced relative to the pivot shaft 19.

Between and across right and left opposed sides of the base end portion 20, a support shaft 25 provided at one end of the first link 21 is pivotally supported; and the first link 21 is coupled to the lower portion of the base end portion 20 to be pivotable about the axis of the support shaft 25.

Figure 4:
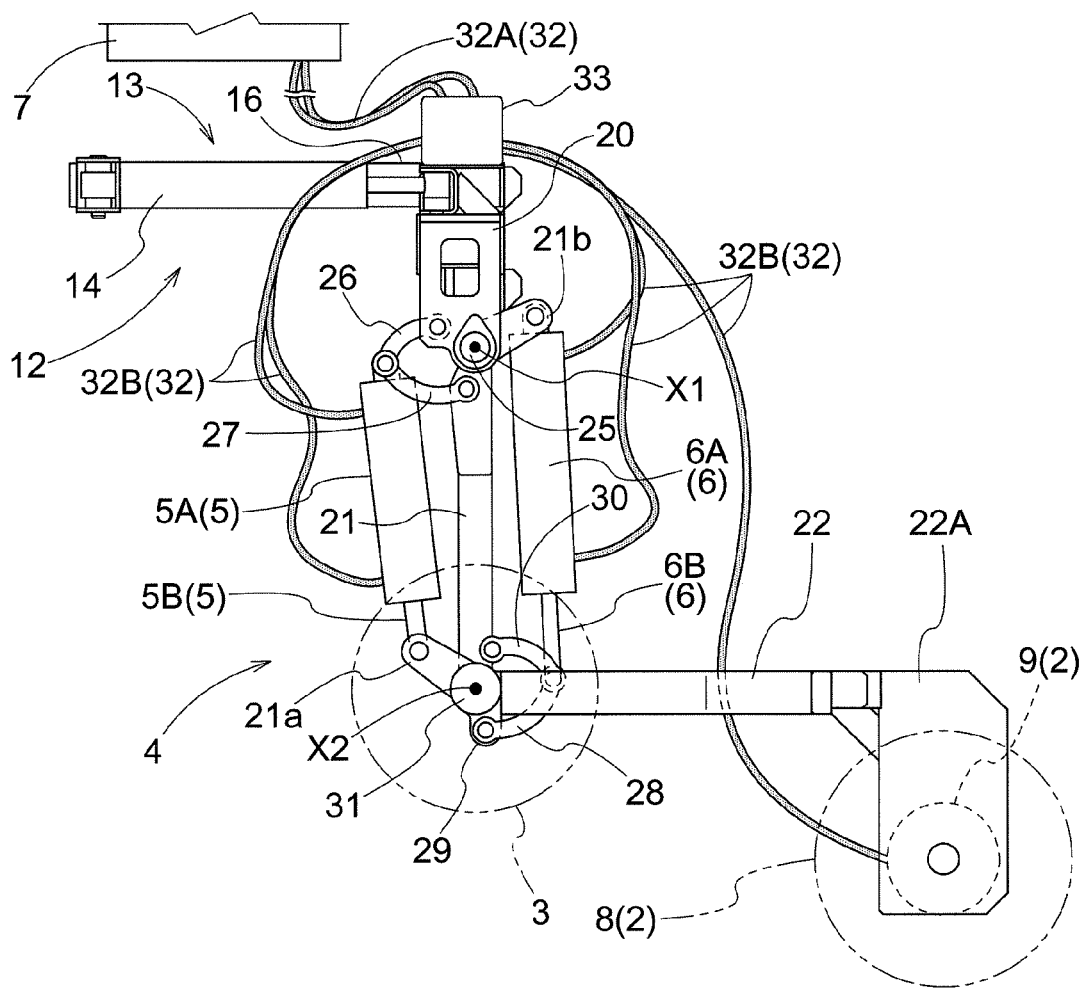
FIG. 4 is a side view of the bending link mechanism.
Figure 5:
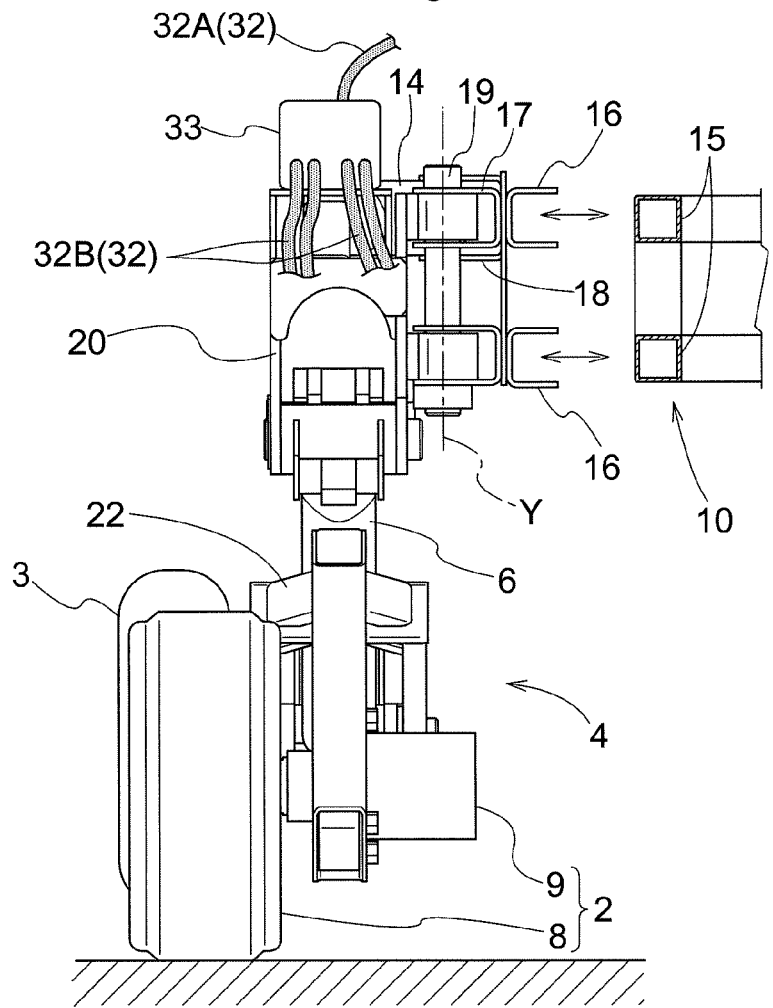
FIG. 5 is a front view showing an attachment state of the bending link mechanism under a removed state.
Figure 6:
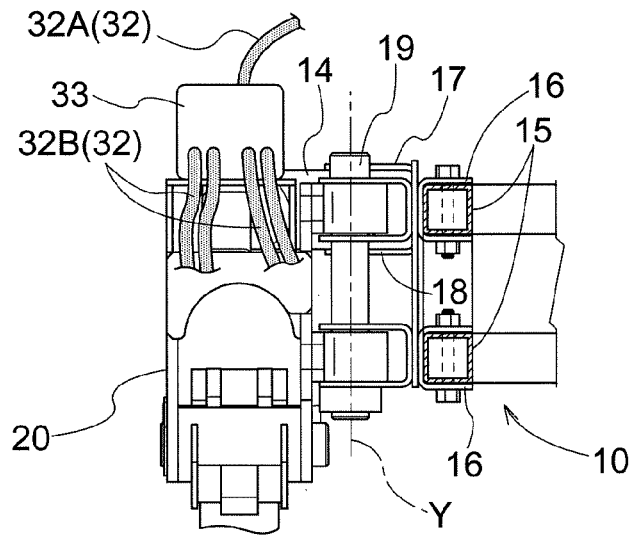
FIG. 6 is a front view showing an attachment state of the bending link mechanism under an attached state.

As shown in FIG. 4, the first link 21 includes a base end side arm portion 21b and an other end side arm portion 21a. At one end side portion of the first link 21, there is integrally formed the base end side arm portion 21b which extends obliquely outwardly upwards. At the other end side portion of the first link 21, there is integrally formed the other end side arm portion 21a which extends obliquely upwardly outwards.

Figure 3:
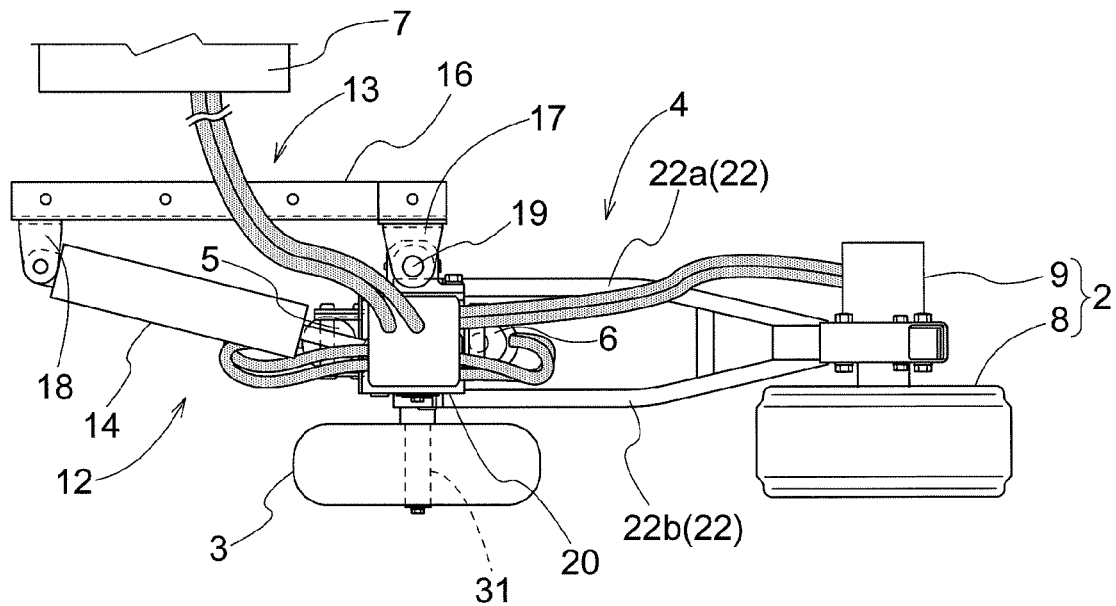
FIG. 3 is a plan view of a bending link mechanism.

As shown in FIG. 3, the second link 22 is bifurcated with a pair of right and left band-plate like plate bodies 22a, 22b, as seen in a plan view. The pair of plate bodies 22a, 22b keep the spacing distance from each other at the coupling portions of the second link 22 relative to the first link 21. At the area sandwiched by the pair of plate bodies 22a, 22b, a coupling pivot shaft 31 to be coupled with the first link 21 is pivotally supported. At the pivotal side end portion of the second link 22 opposite to the coupling portion thereof relative to the first link 21, the traveling device 2 is supported. As shown in FIG. 4, at the pivotal side end portion of the second link 22, there is formed an L-shaped extension portion 22A that extends in the form of an approximate L-letter in the direction away from the vehicle body 1; and at the extension end portion of this L-shaped extension portion 22A, the traveling device 2 is supported.

Each one of the four bending link mechanisms 4 includes a first hydraulic cylinder 5 capable of changing the pivotal posture of the first link 21 relative to the vehicle body 1 and a second hydraulic cylinder 6 capable of changing the pivotal posture of the second link 22 relative to the first link 21. The first hydraulic cylinder 5 and the second hydraulic cylinder 6 are disposed in concentration in the vicinity of the first link 21 respectively.

The first link 21, the first hydraulic cylinder 5 and the second hydraulic cylinder 6 are disposed between the pair of plate bodies 22a, 22b of the second link 22 as seen in the plan view. As shown in FIGS. 3 and 4, the first hydraulic cylinder 5 is disposed on the vehicle body front/rear direction inner side relative to the first link 21 and provided along the longitudinal direction of the first link 21.

As shown in FIG. 4, the first hydraulic cylinder 5 has an upper end portion of its cylinder tube 5A operably coupled to a lower portion of the base end portion 20 via a first interlocking member 26 that is formed arcuate. The upper end portion of the cylinder tube 5A is operably coupled to a base end side portion of the first link 21 via a further second interlocking member 27. The first interlocking member 26 and the second interlocking member 27 have respective opposed ends thereof pivotally coupled to each other to be pivotable relative to each other. The lower end portion (leading end portion) of the piston rod 5B of the first hydraulic cylinder 5 is pivotally coupled to the other end side arm portion 21a formed integrally in the first link 21. Therefore, the piston rod 5B side of the first hydraulic cylinder 5 is pivotally coupled to the other end side arm portion 21a as the coupled portion on the side of the first link 21.

The second hydraulic cylinder 6 is disposed on the opposite side to the first hydraulic cylinder 5, namely, on the vehicle body front/rear direction outer side relative to the first link 21 and provided along the longitudinal direction of the first link 21. The second hydraulic cylinder 6 has an upper end portion of its cylinder tube 6A operably coupled to the base end side arm portion 21b formed integrally to the base end side of the first link 21. The lower end portion (leading end portion) of the piston rod 6B as the other end portion of the second hydraulic cylinder 6 is operably coupled to an arm portion 29 formed integrally to the base end side portion of the second link 22 via a third interlocking member 28 that is formed arcuate. The lower end portion of the piston rod 6B of the second hydraulic cylinder 6 is operably coupled also to the pivotal end side portion of the first link 21 via a further/fourth interlocking member 30. The third interlocking member 28 and the fourth interlocking member 30 have respective opposed ends thereof pivotally coupled to be pivotable relative to each other.

If the first hydraulic cylinder 5 is expanded/contracted when the second hydraulic cylinder 6 is stopped, the first link 21, the second link 22 and the traveling device 2 respectively will be pivoted about the horizontal axis X1 at the pivotal coupling portion relative to the base end portion 20 with maintaining the relative postures thereof. Therefore, the first hydraulic cylinder 5 for operating the first link 21 is configured to pivot the first link 21 in association with an expansion/contraction operation associated with work oil feeding from the work oil feeding device 7 included in the vehicle body 1.

If the second hydraulic cylinder 6 is expanded/contracted when the first hydraulic cylinder 5 is stopped, the second link 22 and the traveling device 2 will be pivoted together about a horizontal axis X2 at the coupling portion with the first link 21 and the second link 22 with maintaining the posture of the first link 21 relative to the vehicle body 1 constant.

At the intermediate bending portion of each one of the four bending link mechanisms 4, the auxiliary wheel 3 is supported. As shown in FIGS. 1 and 2, the auxiliary wheel 3 is constituted of a wheel having an approximately equal outside diameter to that of the drive wheel 8 of the traveling device 2. As shown in FIG. 3, the coupling pivot shaft 31, that pivotally couples the first link 21 to the second link 22, extends to project outward of the second link 22 in the vehicle body lateral width direction. The auxiliary wheel 3 is rotatably supported on the coupling pivot shaft 31 at the extended/projected portion thereof. That is, the coupling pivot shaft 31 that pivotally couples the first link 21 to the second link 22 is configured to act also as a pivot shaft for the auxiliary wheel 3, thus simplification of arrangement through component co-utilization being sought for.

Figure 7:
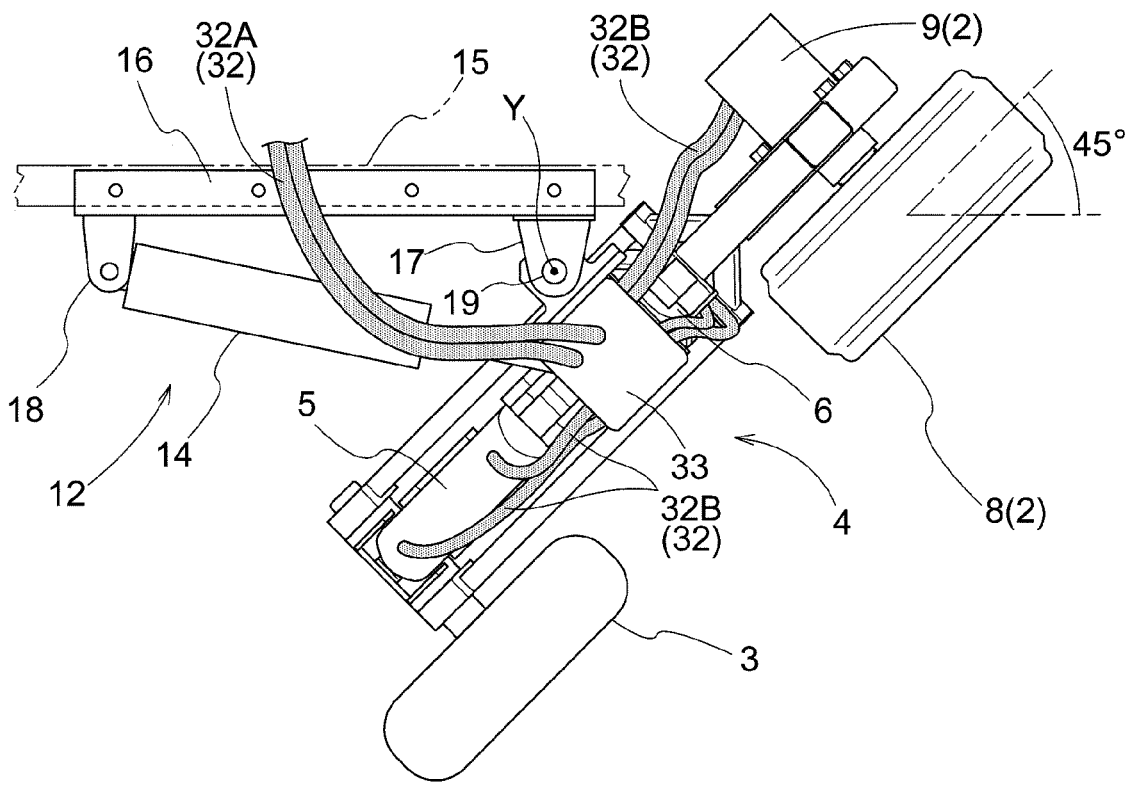
FIG. 7 is a plan view showing a left turning state by a turning mechanism.
Figure 8:
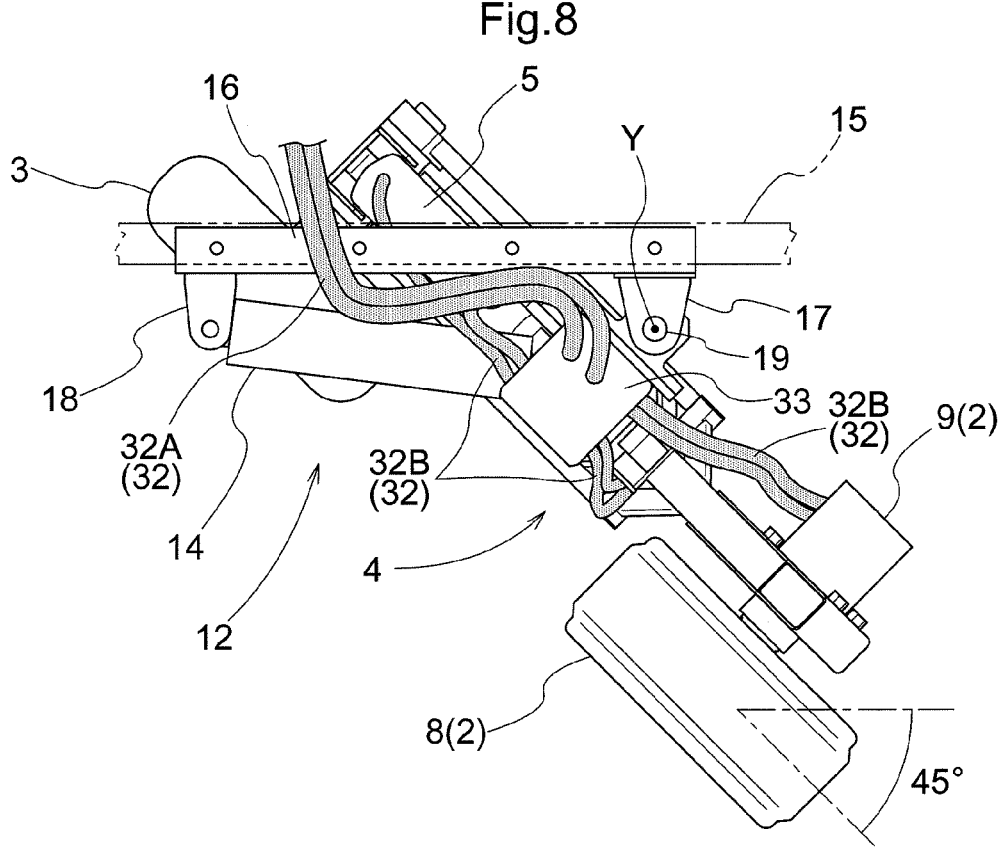
FIG. 8 is a plan view showing a right turning state by the turning mechanism.

As shown in FIGS. 7 and 8, the bending link mechanism 4, the traveling device 2, the auxiliary wheel 3, the first hydraulic cylinder 5 and the second hydraulic cylinder 6 respectively are supported to the outer side pivot bracket 17 to be pivotable together about the vertical axis Y of the pivot support shaft 19. And, these will be pivotally operated together by expanding/contracting the turning cylinder 14. Turning operation is possible for each increment of approximately 45 degrees from a straight traveling state in which the traveling device 2 is oriented in the front/rear direction to the left turning direction and the right turning direction, respectively.

If bolt coupling of the coupling member 16 to a front/rear oriented frame body 15 is released, it becomes possible to remove the turning mechanism 12, the bending link mechanism 4, the traveling device 2, the auxiliary wheel 3 and the hydraulic cylinder 5, as being assembled to each other, from the vehicle body 1 altogether. Also, by bolt-coupling the coupling member 16 to the front/rear oriented frame body 15, it is possible to attach the above respective devices, as being assembled together, to the vehicle body 1 altogether.

With feeding/discharging of work oil to/from the work oil feeding device 7 to/from the first hydraulic cylinder 5 and the second hydraulic cylinder 6 of each one of the plurality of bending link mechanisms 4, the first hydraulic cylinder 5 and the second hydraulic cylinder 6 can be expanded/contracted. With execution of flow rate adjustment of the work oil to the hydraulic motor 9, the rotational speed of the hydraulic motor 9, i.e. of the drive wheel 8, can be changed.

From the work oil feeding device 7 to the first hydraulic cylinder 5, the second hydraulic cylinder 6 and the hydraulic motor 9 respectively, there is provided a hydraulic hose 32 (an example of "work oil feeding tube") for feeding the work oil. And, as shown in FIG. 3 and FIG. 4, at an upper portion side portion of the base end portion 20 as the vicinity of the turning mechanism 12, there is provided a work oil relaying device 33 (an example of "feeding pipe holding portion") for holding in position the hydraulic hose 32 for feeding the work oil from the work oil feeding device 7 to the first hydraulic cylinder 5, the second hydraulic cylinder 6 and the hydraulic motor 9, respectively. The work oil relaying device 33 functions to relay-connect the hydraulic hose 32 that connects the work oil feeding device 7 with each hydraulic device (hydraulic cylinder 5 and hydraulic motor 9) in the bending link mechanism 4 corresponding thereto, and the device 33 is fixedly attached to the base end portion 20 under a position-fixed state. Therefore, the hydraulic hose 32 is separated into a body side hose portion 32A closer to the vehicle body 1 than the work oil relaying device 33, and a leading end side hose portion 32B closer to the hydraulic device.

With provision of such work oil relaying device 33 described above, even after repetitions of the expanding/contracting operations of the bending link mechanism 4 and the turning operation of the turning mechanism 12, such trouble or inconvenience as entrapping of the plurality of hydraulic hoses 32 connecting the work oil feeding device 7 to the respective hydraulic devices in the bending link mechanisms 4 or between the links can be reduced, so that the operations can be carried out in a favorable manner.

As shown in FIG. 1, this work vehicle includes various sensors. Specifically, the work vehicle includes a first head side pressure sensor S1 and a first cap side (remote-from-head side) pressure sensor S2 included in the respective first hydraulic cylinder 5; and a second cap side pressure sensor S3 and a second head side (remote-from-cap side) pressure sensor S4 included in the respective second hydraulic cylinder 6. The first head side pressure sensor S1 detects an oil pressure of the head side chamber of the first hydraulic cylinder 5. The first cap side pressure sensor S2 detects an oil pressure of the cap side chamber of the first hydraulic cylinder 5. The second cap side pressure sensor S3 detects an oil pressure of the head side chamber of the second hydraulic cylinder 6. The second head side pressure sensor S4 detects an oil pressure of the cap side chamber of the second hydraulic cylinder 6. Further, though not shown, each of the hydraulic cylinders as described above (the first hydraulic cylinder 5, the second hydraulic cylinder 6 and the turning cylinder 14) incorporates a stroke sensor capable of detecting an expansion/contraction stroke amount and is configured to feedback its operational state to the control device 11.

Incidentally, it is noted that the attachment positions of the respective pressure sensors S1, S2, S3, S4 are not limited to those described above. It is sufficient if each of the pressure sensors S1, S2, S3, S4 may detect (estimate) the oil pressure of the cap side chamber or the head side chamber associated therewith, and thus each sensor may be disposed in a pipe extending from the valve mechanism to the cap side or head side chamber associated therewith.

Based on detection results from these sensors, a force needed for supporting the vehicle body 1 is calculated and based on this result, feeding of work oil to the respective first hydraulic cylinder 5 and second hydraulic cylinder 6 will be controlled. Specifically, based on a detection value of the first head side pressure sensor S1 and a detection value of the first cap side pressure sensor S2, a cylinder propelling force for the first hydraulic cylinder 5 will be calculated from a pressure difference between the cap side chamber and the head side chamber of the first hydraulic cylinder 5. Further, based on a detection value of the second cap side pressure sensor S3 and a detection value of the second head side pressure sensor S4, a cylinder propelling force for the second hydraulic cylinder 6 will be calculated from a pressure difference between the cap side chamber and the head side chamber of the second hydraulic cylinder 6.

The vehicle body 1 includes an acceleration sensor S5 constituted of e.g. a triaxial acceleration sensor or the like. Based on a detection result of the acceleration sensor S5, tilts of the vehicle body 1 to the front/rear sides and right/left sides are detected. And, based on the result, the posture of the vehicle body 1 is controlled. Namely, in order to allow the posture of the vehicle body 1 to become a target posture, feeding of work oil to the respective first hydraulic cylinder 5 and second hydraulic cylinder 6 will be controlled.

The traveling device 2 includes a rotation sensor S6 for detecting a rotational speed of the drive wheel 8. In operation, based on the rotational speed of the drive wheel 8 calculated by the rotation sensor S6, feeding of work oil to the hydraulic motor 9 will be controlled in such a manner that the rotational speed of the drive wheel 8 may become a target value.

As described above, the work vehicle according to the instant embodiment is configured such that the traveling devices 2 are supported via the respective bending link mechanisms 4 and also that the postures of the bending link mechanisms 4 are changed by the hydraulic cylinders 5, 6.

Moreover, driving of traveling is done by the hydraulic motor 9 also. Therefore, the work vehicle is suitable for an agricultural work as being robust against adverse influence from water content, fine dust or the like, unlike an electric motor for instance.

As examples of use of the work vehicle having the above-described configuration, the following traveling modes can be cited.

<Traveling on Flat Ground Surface>

Figure 9:
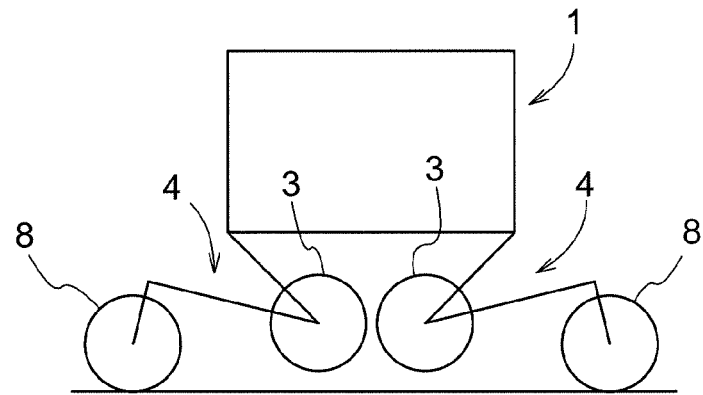
FIG. 9 is an explanatory view of a four-wheel traveling state.
Figure 10:
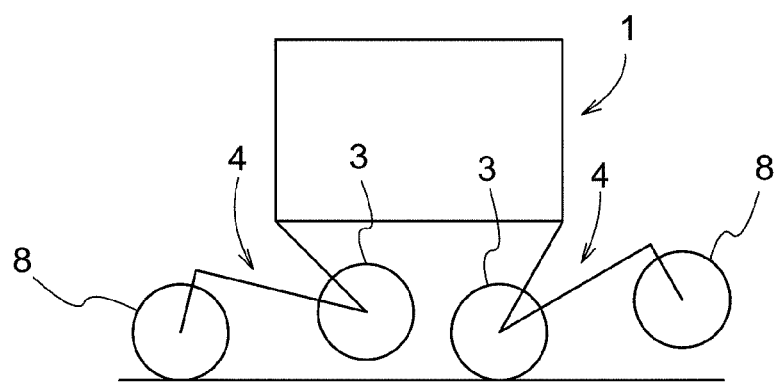
FIG. 10 is an explanatory view of a two-wheel traveling state.
Figure 11:
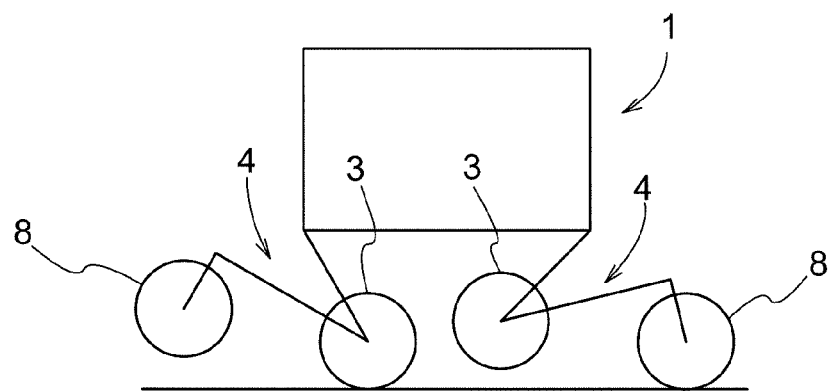
FIG. 11 is an explanatory view of the two-wheel traveling state.

In the case of traveling on a flat ground surface, as shown in FIGS. 9, 10 and 11, traveling is possible in any one of a plurality of different kinds of traveling modes. Namely, as shown in FIG. 9, a four-wheel traveling mode is possible in which all of the four traveling devices 2 (specifically the drive wheels 8) are placed in contact with the ground surface and also all of the four auxiliary wheels 3 are lifted afloat off the ground surface; and, as shown in FIG. 10, a two-wheel traveling mode is possible in which the drive wheels 8 disposed on one vehicle body front/rear direction side are set afloat and the auxiliary wheels 3 corresponding thereto are placed in contact with the ground surface, and also the drive wheels 8 disposed on the other vehicle body front/rear direction side are placed in contact with the ground surface and the auxiliary wheels 3 corresponding thereto are set afloat.

In an alternatively possible state of the two wheel driving mode, the relation between the drive wheels 8 and the auxiliary wheels 3 is reversed in the vehicle body front/rear direction. Namely, as shown in FIG. 11, the drive wheels 8 disposed on vehicle body front/rear one side are placed in contact with the ground surface and the auxiliary wheels 3 corresponding thereto are lifted afloat the ground surface, and the drive wheels 8 disposed on the other vehicle body front/rear side are set afloat and the auxiliary wheels 3 corresponding thereto are placed in contact with the ground surface.

More particularly, in the bending link mechanisms 4, each one of the four sets of bending link mechanisms 4 is configured to be switched over between a traveling state in which the drive wheels 8 are placed in contact with the ground surface and the auxiliary wheels 3 corresponding thereto are lifted afloat the ground surface, and a free movement state in which the auxiliary wheels 3 are placed in contact with the ground surface and the drive wheels 8 corresponding thereto are lifted afloat the ground surface.

In the four-wheel traveling state described above, all of the four sets of drive wheels 8 are set under the traveling state; and in the two-wheel traveling state described above, two sets of drive wheels 8 on one vehicle body front/rear side of the four sets of drive wheels 8 are set to the traveling state and the auxiliary wheels 3 on the other side are placed in contact with the ground surface for the free movement condition.

Further, in addition to the four-wheel traveling state and the two-wheel traveling state described above, it is also possible to switch to a partial traveling state in which three sets of the drive wheels 8 of the four sets of drive wheels 8 are set to the traveling state and the other one drive wheel 8 is lifted afloat the ground surface, With this, it is possible to carry out an operation of extending one drive wheel 8 to a position upwardly of a ground surface gap or step with keeping stable ground surface contact via the remaining three drive wheels 8, for instance.

Figure 12:
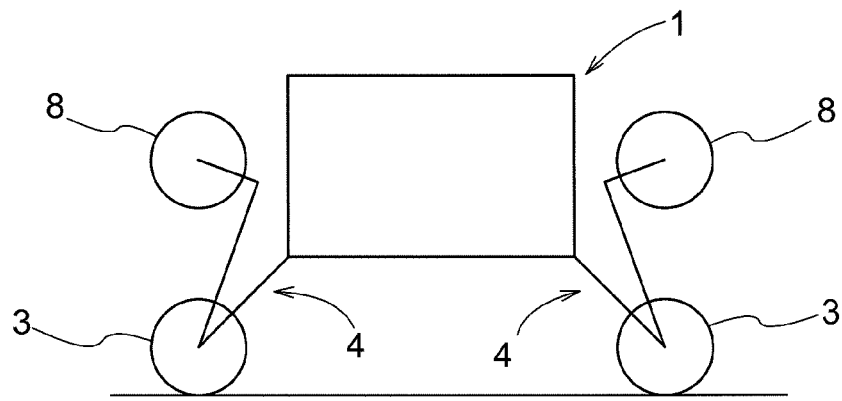
FIG. 12 is a side view of a free moving state.

In addition to the traveling modes described above, as shown in FIG. 12, it is also possible to switch to an all-free traveling state in which all of the four sets of drive wheels 8 are lifted afloat the ground surface to provide the free movement state. In this case, traveling drive is not possible, but the vehicle can be easily moved manually.

With this work vehicle, in addition to the traveling modes on a flat ground surface described above, as unique additional uses thereof, the vehicle may be used in further modes as follow.

<Two-Leg Erect Mode>

By tilting the vehicle body 1 largely, the traveling devices 2 (specifically the drive wheels 8) can be placed on a high place.

Figure 13:
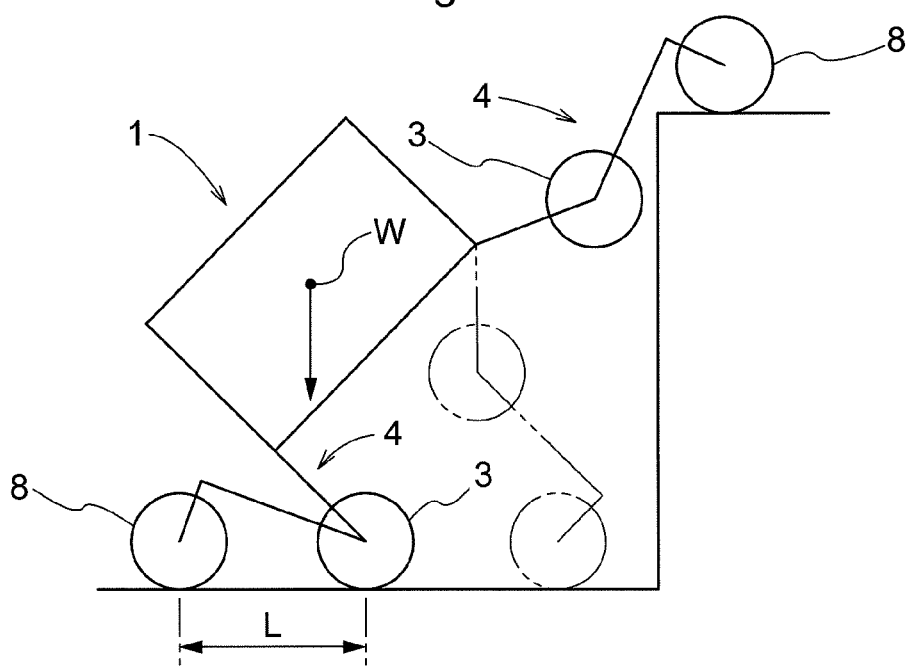
FIG. 13 is a side view showing a step riding-over state.

Namely, as shown in FIG. 13, while two sets of drive wheels 8 and auxiliary wheels 3 on vehicle body front/rear one side are all placed in contact with the ground surface, the vehicle body 1 will be tilted largely so that other side may be elevated, with using the bending link mechanisms 8 supporting the two sets of drive wheels 8 and the auxiliary wheels 3 on the other side in the vehicle body front/rear direction. And, when the vehicle body 1 has been tilted until a gravity center position W of the vehicle body 1 comes to a position located within a ground contacting width L between the two sets of the drive wheels 8 and auxiliary wheels 3 on the one side, and then the two sets of bending link mechanisms 4 on the other side can be extended largely, whereby the drive wheels 8 can be placed on a ground surface at a high position.

Figure 14:
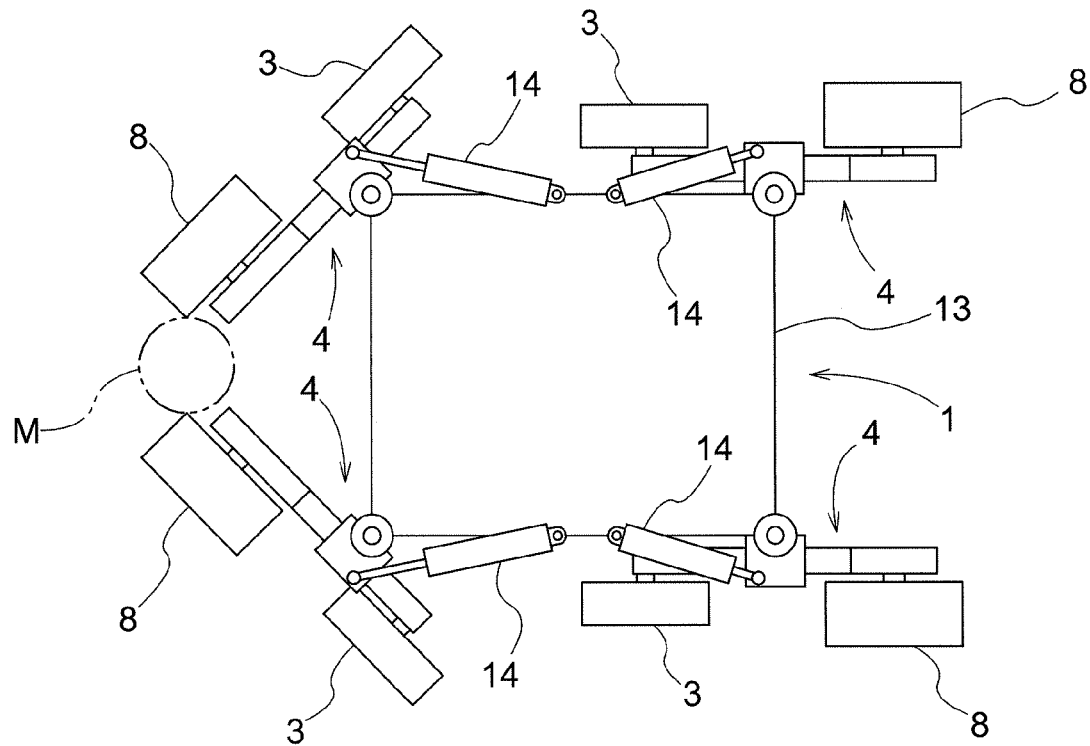
FIG. 14 is a plan view of an article transporting state.
Figure 15:
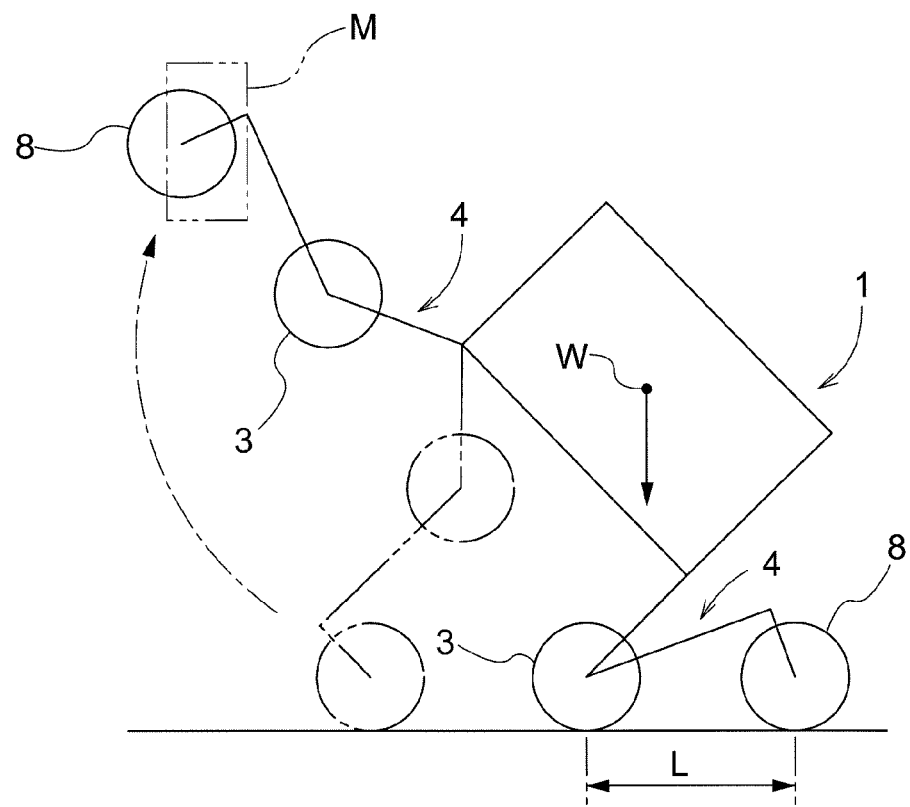
FIG. 15 is a side view of an article transporting state.

In this two leg erect mode, in addition to the mode of riding onto a high place, as shown in FIG. 14 and FIG. 15, an operation of lifting up another object is also possible. Namely, as described above, the vehicle body 1 will be tilted largely with keeping two sets of drive wheels 8 and auxiliary wheels 3 on one side in the vehicle body front/rear direction being placed in contact with the ground surface, until the gravity center position W of the vehicle body 1 comes to the position within the ground contact width L of the two sets of drive wheels 8 and the auxiliary wheels 3 on one side. Further, a turning operation will be made so that the two sets of drive wheels 8 on the other side in the vehicle body front/rear direction come closer to each other. And, an object M as an object of transport will be lifted up by the two sets of drive wheels 8 on the other side in the vehicle body front/rear direction. Under the state of the object M being held, traveling can be made with maintaining the posture of the vehicle body 1 by the two sets of drive wheels 8 and the auxiliary wheels 3 on onside in the vehicle body front/rear direction, whereby the object M may be transported.

<Slope Traveling Mode>

Figure 16:
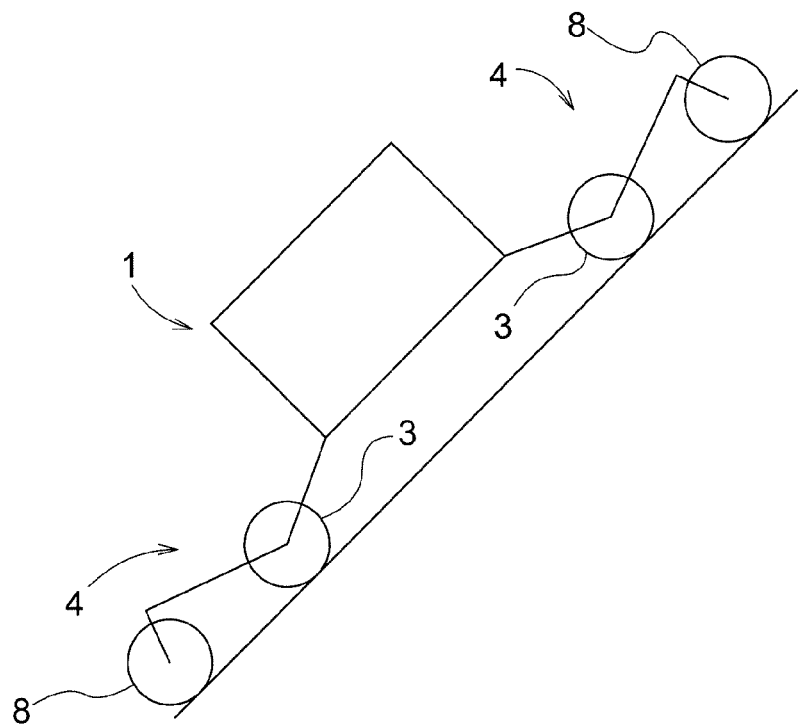
FIG. 16 is a side view of a slope traveling state.

As shown in FIG. 16, for all of the four sets of drive wheels 8 and auxiliary wheels 3, the posture of the bending link mechanism 4 will be changed to an extended posture in which the drive wheel 8 and the auxiliary wheel 3 respectively is located on more outer side in the vehicle body front/rear direction than the vehicle body front/rear outer end. With keeping the drive wheels 8 and the auxiliary wheels 3 all in contact with the ground surface, the height of the vehicle body 1 is set to a low position by setting the first link 21 and the second link 22 as close as possible to the horizontal posture. Under this condition, the vehicle travels as climbing a slope. In this traveling mode, the ground contact width along the vehicle body front/rear direction is increased, so that even on a largely tilted slope, stable traveling is possible without toppling.

<Step Riding-Over Mode>

When three sets of drive wheels 8 and auxiliary wheels 3 are all placed on the ground surface for stable support of the vehicle body 1 on the ground surface, the bending link mechanism 4 which supports the other remaining one set of drive wheel 8 and auxiliary wheel 3 will be extended largely to place the drive wheel 8 on an upper face of a step, as shown in FIG. 13 for instance. Then, as movement is made with riding each one set of drive wheel 8 onto the upper portion of the step, it is possible to ride over the step. In FIG. 13, there is shown a situation in which the step is steep. If the step is of a low profile, then, the vehicle body 1 can ride over it.

<Stride-Over Traveling Mode>

Figure 17:
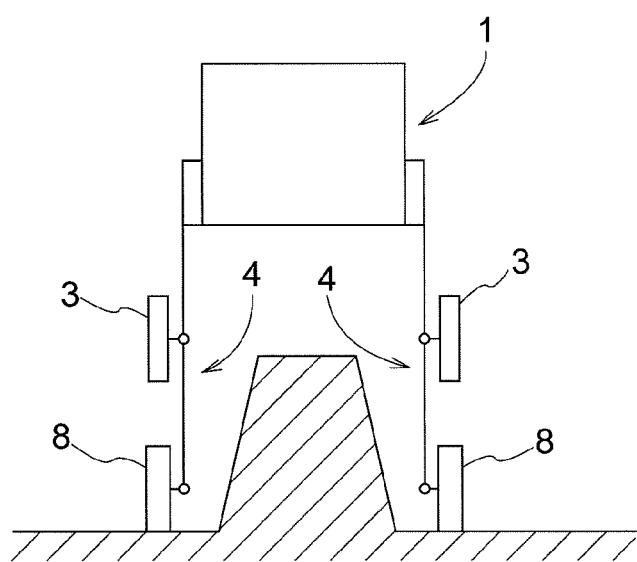
FIG. 17 is a side view of a stride-over traveling state.

As shown in FIG. 17, by largely extending the four sets of bending link mechanisms 4, the vehicle body 1 is largely elevated off the ground surface. With this, for instance, a work is possible with keeping the vehicle body upwards as striding over a ridge. Even when an agricultural produce planted on the ridge has grown, such operations as chemical spraying, harvesting, etc. are possible from above the produce.

Incidentally, the above-described modes of use are possible also in arrangements in a second embodiment to be described later.

Modified Embodiments of First Embodiment (1) In the foregoing embodiment, each traveling device 2 is driven by the hydraulic motor 9. In place of this arrangement, it is also possible to arrange e.g. such that power of an engine mounted on the vehicle is supplied to the drive wheel 8 via a mechanical power transmission mechanism such as a chain transmission mechanism.

(2) In the foregoing embodiment, each traveling device 2 includes one drive wheel 8. In place of this arrangement, it is also possible to arrange such that as the traveling device 2, there is provided a crawler traveling device with a crawler belt wound around a plurality of wheel bodies.

(3) In the foregoing embodiment, four traveling devices 2 are provided with a right/left pair thereof on each of front/rear opposed sides of the vehicle body 1. Instead, it is possible to provide three traveling devices 2 or five or more traveling devices 2.

(4) In the foregoing embodiment, the turning mechanism 12 is disposed between the vehicle body 1 and the bending link mechanism 4 as seen in the plan view, and the turning mechanism 12 is disposed at a position higher than the bending link mechanism 4 as seen in a side view. In place of this arrangement, the turning mechanism 12 may be overlapped with the vehicle body 1 as seen in the plan view or overlapped with the bending link mechanism 4; and still alternatively the turning mechanism 12 may be disposed at the same position as the bending link mechanism 4 as seen in the side view. As such, the disposing position of the turning mechanism 2 may be varied in many ways. Further, with omission of the turning mechanisms, a turning may be made based on a drive speed difference between the right and left traveling devices 2.

(5) In the foregoing embodiment, the bending link mechanism 4 includes two links 21, 22. However, the number of links is not limited to two, but three or more links can be included. In this case, the hydraulic cylinders too will be provided three or more.

(6) In the foregoing embodiment, as the feeding pipe holding portion for position holding the hydraulic hose 32, the work oil relaying device 33 is provided. However, the arrangement without such work oil relaying device is also possible.

(7) In the foregoing embodiment, a four-leg, four-wheel robot of hydraulic electronic control type was used as an example of "work vehicle". However, the present invention is not limited to the modes shown in the drawings.

Second Embodiment

Figure 18:
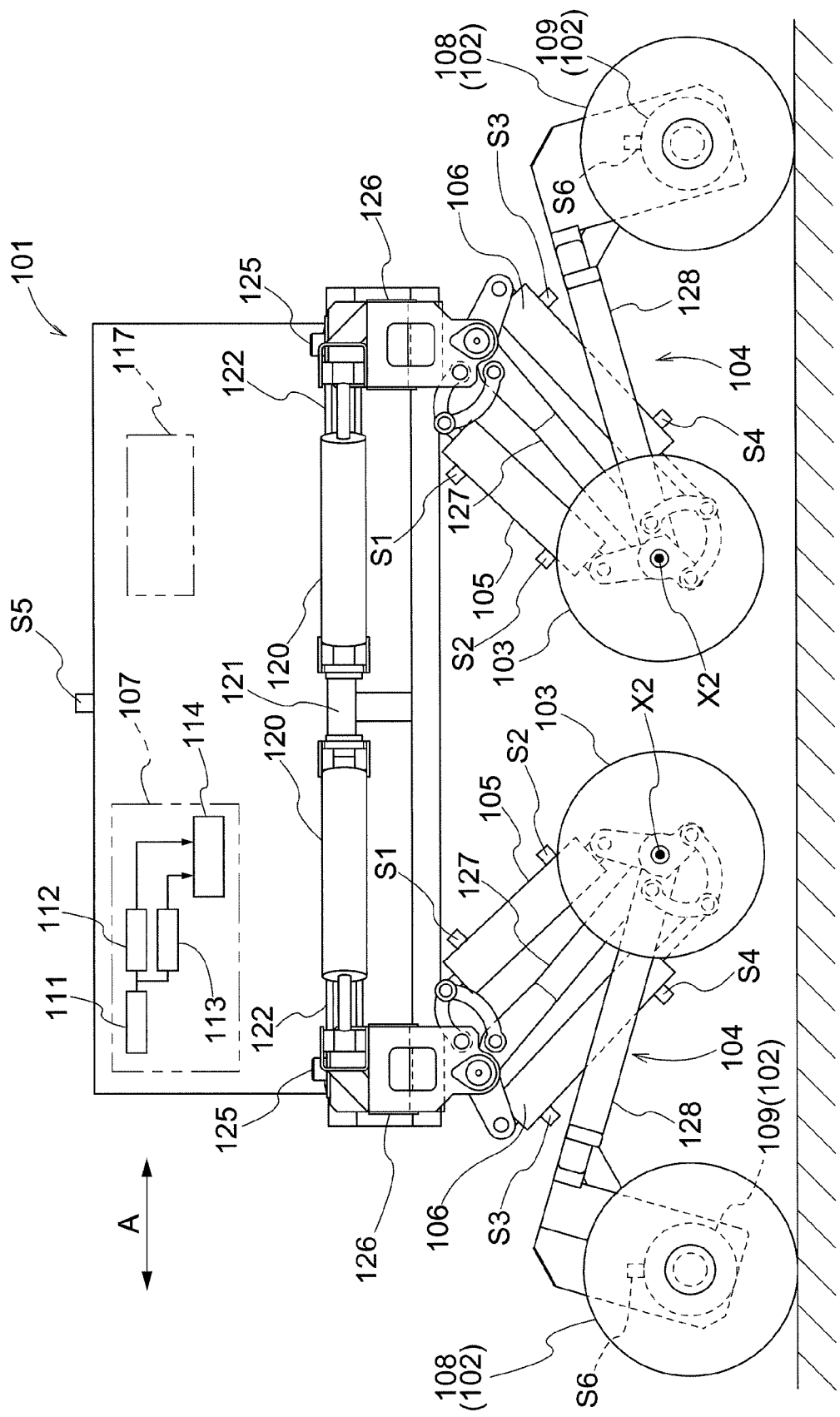
FIG. 18 is an overall side view showing a work vehicle according to a second embodiment (applied also through to FIG. 28)
Figure 19:
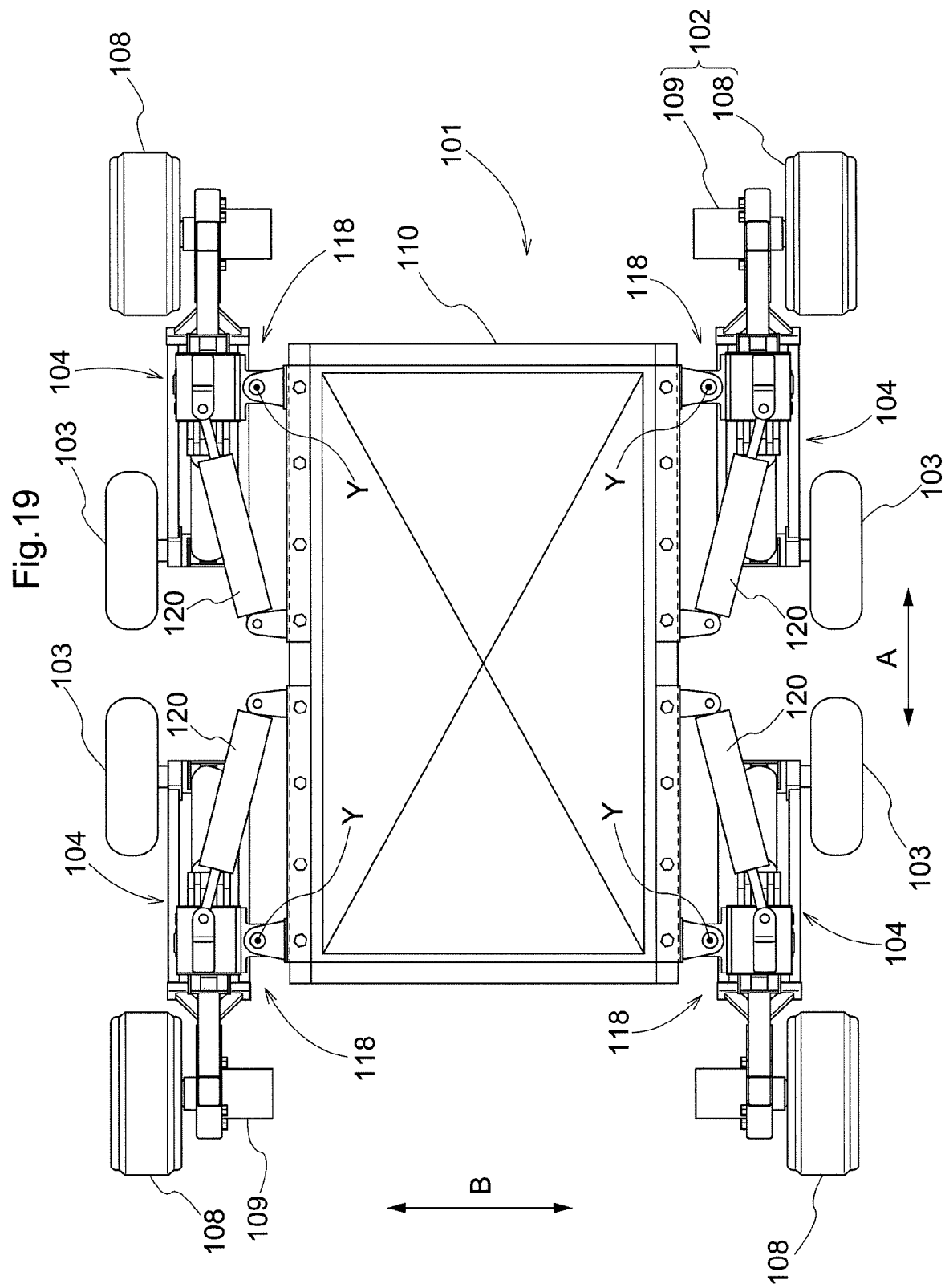
FIG. 19 is an overall plan view of the work vehicle.

As shown in FIG. 18 and FIG. 19, a work vehicle includes a vehicle body 101 in the form of an approximately rectangular frame for supporting the entire vehicle, a plurality of ("four" in specific) traveling devices 102 driven by hydraulic motors 109, a plurality of auxiliary wheels 103 provided in correspondence with the respective plurality of traveling devices 102, bending link mechanisms 104 (an example of "vehicle body supporting portion" and "articulate link mechanism") for supporting the plurality of traveling devices 102 respectively to the vehicle body 101 with allowing changes of respective positions of the plurality of traveling devices 102, a plurality of hydraulic cylinders 105, 106 capable of changing postures of the respective bending link mechanisms 104, and a work oil feeding deice 107 as a hydraulic (pressure oil) source for feeding work oil to the hydraulic motors 109 and the plurality of hydraulic cylinders 105, 106.

Each one of the plurality of traveling devices 102 includes a drive wheel 108 supported to be rotatable about a horizontal axis and the hydraulic motor 109 incorporated within a bearing portion of the drive wheel 108. Each traveling device 102 can rotatably drive the drive wheel 108 associated therewith by operating the hydraulic motor 109.

In this embodiment, when definition is to be made for the front/rear direction of the vehicle body, this definition is made along the vehicle body advancing direction. When definition is to be made for the right/left direction of the vehicle body, this definition is made as seen in the vehicle body advancing direction. Namely, the direction denoted with a sign (A) in FIG. 18 represents the vehicle body front/rear direction and the direction denoted with a sign (B) in FIG. 19 represents the vehicle body right/left direction.

The vehicle body 101 includes a support frame 110 in the form of a rectangular frame that surrounds the entire circumference of the vehicle body 101 and that also supports it entirely. The work oil feeding device 107 is accommodated and supported inside the vehicle body 101. The work oil feeding device 107, as shown in FIG. 18, includes two hydraulic pumps 112, 113 that are driven by an engine 111 mounted on the vehicle, a hydraulic control unit 114 configured to control feeding states of work oil fed from the hydraulic pumps 112, 113 to the plurality of hydraulic cylinders 105 and to the plurality of hydraulic motors 109, a work oil tank (not shown) for reserving an amount of work oil therein, etc. and effects feeding/discharging of the work oil, adjustment of its flow rate (amount), etc.

More particularly, as shown in FIG. 26, there are provided a first hydraulic pump 112 for feeding work oil to the plurality of hydraulic motors 109 and a second hydraulic pump 113 for feeding work oil to the plurality of hydraulic cylinders 105, 106. The first hydraulic pump 112 and the second hydraulic pump 113 are both driven by the engine 111. And, the hydraulic control unit 114 includes a first hydraulic control section (VU1) 115 for controlling work oil feeding condition to the respective hydraulic motors in order to set the pressure oil from the first hydraulic pump 112 to an appropriate condition suitable for the work situation and a second hydraulic control section (VU2) 116 for controlling work oil feeding condition to the respective hydraulic cylinders 105, 106 in order to set the pressure oil from the second hydraulic pump 113 to an appropriate condition suitable for a work situation.

The first hydraulic control section 115 includes four electromagnetic type hydraulic control valves (not shown) for adjusting pressure oil feeding conditions to the four hydraulic motors 109 respectively. The second hydraulic control section 116 includes eight electromagnetic hydraulic control valves (not shown) for adjusting pressure oil feeding conditions to the eight hydraulic cylinders 105, 106, respectively.

Inside the vehicle body 1, there is provided a control device 117 for controlling operations of the work oil feeding device 107. The control operations by the control device 117 will not be detailed herein. Briefly, however, based on instruction information inputted via an unillustrated manual input device (e.g. a remote controller, etc.) or based on instruction information set and stored in advance, the work oil feeding states by the first hydraulic control section 115 to the plurality of hydraulic motors 109 are controlled and also the work oil feeding states by the second hydraulic control section 116 to the plurality of hydraulic cylinders 105, 106 are controlled. By operations of the hydraulic cylinders 105, 106, the respective postures of the plurality of bending link mechanisms 104 can be changed. At an intermediate bending portion (see FIG. 21) of each one of the plurality of bending link mechanisms 104, the auxiliary wheel 103 is rotatably supported. As shown in FIG. 18 and FIG. 19, the auxiliary wheel 103 is constituted of a wheel having an approximately equal outside diameter to that of the drive wheel 108 of the traveling device 102.

Next, a support arrangement for supporting the traveling devices 102 to the vehicle body 101 will be described.

The four traveling devices 102 are supported to the vehicle body 101 to be liftable up/down via the respective bending link mechanisms 104. Each bending link mechanism 104 is supported to the vehicle body 101 with its orientation being changeable about a vertical axis by a turning mechanism 118.

The bending link mechanism 104 is supported to a support frame 110 to be pivotable about a vertical axis Y via the turning mechanism 118. The turning mechanism 118 includes a vehicle body side supporting portion 119 (see FIG. 20 and FIG. 21) which is coupled to the support frame 110 and which also pivotally supports the bending link mechanism 104; and a turning hydraulic cylinder (to be referred to as "turning cylinder" hereinafter) 120 for turning the bending link mechanism 104.

More particularly, as shown in FIG. 20, FIG. 21, FIG. 22 and FIG. 23, the vehicle body side supporting portion 119 includes a coupling member 122 which is engaged with a pair of upper and lower front/rear oriented frame bodies 121, in the form of angular cylinders provided at lateral portions of the support frame 110, by sandwiching the frame bodies 121 from lateral outer sides thereof and which also is to be removably bolt-connected thereto; an outer side pivot bracket 123 disposed at an outer side portion in the vehicle body front/rear direction of the coupling member 122; an inner side pivot bracket 124 disposed at an inner side portion in the vehicle body front/rear direction of the coupling member 122; and a vertically oriented pivot shaft 125 supported to the outer side pivot bracket 125, so that the vehicle body side supporting portion 119 supports the bending link mechanism 104 with allowing pivotal movements thereof about the vertical axis Y of the pivot shaft 125.

The bending link mechanism 104 includes a base end portion 126 which has its position fixed in the vertical direction and which is supported to the vehicle body side supporting portion 119 to be pivotable about the vertical axis Y; a first link 127 having one end portion thereof supported to a lower portion of the base end portion 126 to be pivotable about a horizontal axis X1; and a second link 128 having one end portion thereof supported to the other end portion of the first link 127 to be pivotable about a horizontal axis X2 and having the other end portion thereof supported to the traveling device 102. Therefore, the bending link mechanism 104 comprises an articulated link mechanism having two joints.

More particularly, the base end portion 126 is provided in the form of a rectangular frame as seen in a plan view; and at a position offset inward in the vehicle body lateral width direction, the base end portion is supported to the outer side pivot bracket 123 of the vehicle body side supporting portion 119 to be pivotable about the vertical axis Y via the pivot shaft 125. The turning cylinder 120 has one end portion thereof pivotally coupled to the inner side pivot bracket 124 and has the other end portion thereof pivotally coupled to a portion of the base end portion 126 laterally displaced relative to the pivot shaft 125.

Between and across right and left opposed sides of the base end portion 126, a support shaft 129 provided at one end of the first link 127 is pivotally supported; and the first link 127 is coupled to the lower portion of the base end portion 126 to be pivotable about the axis of the support shaft 129.

Figure 21:
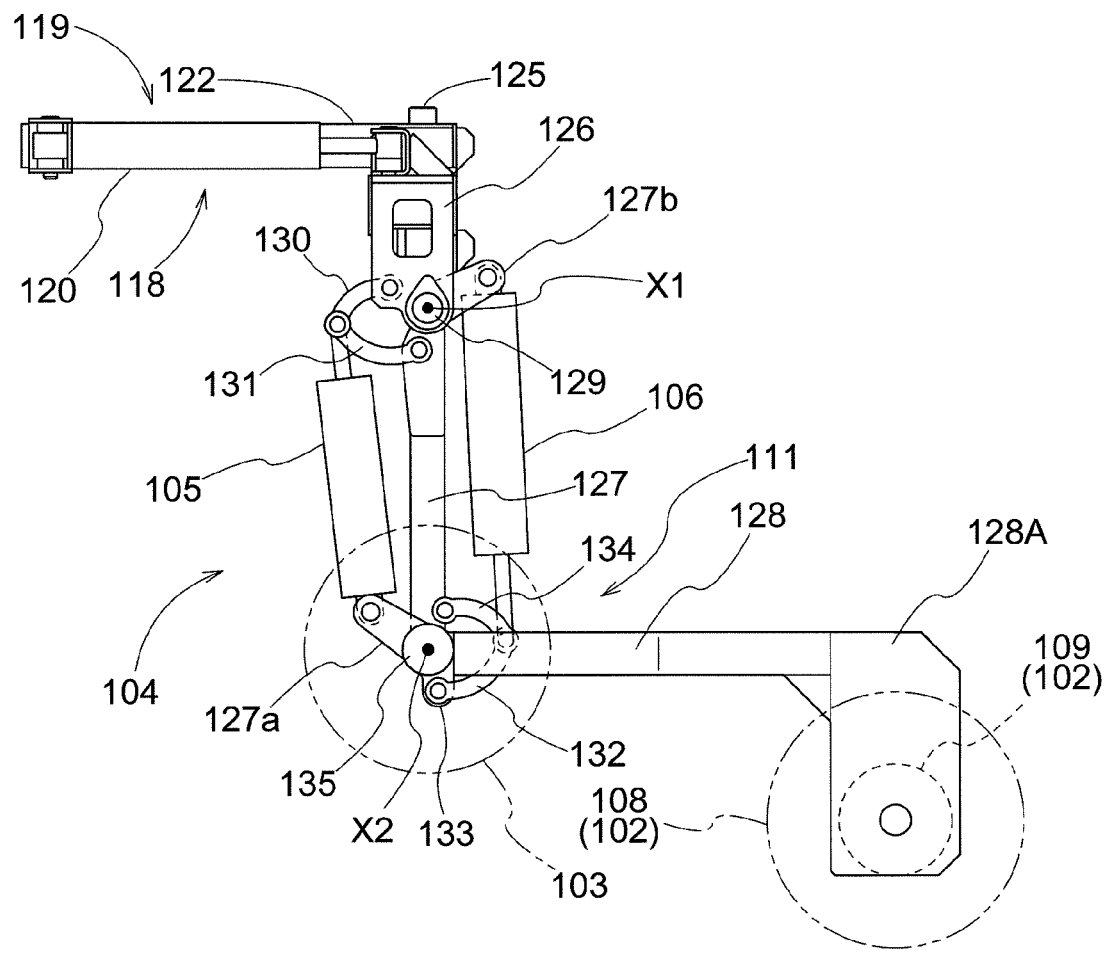
FIG. 21 is a side view of the bending link mechanism.
Figure 22:
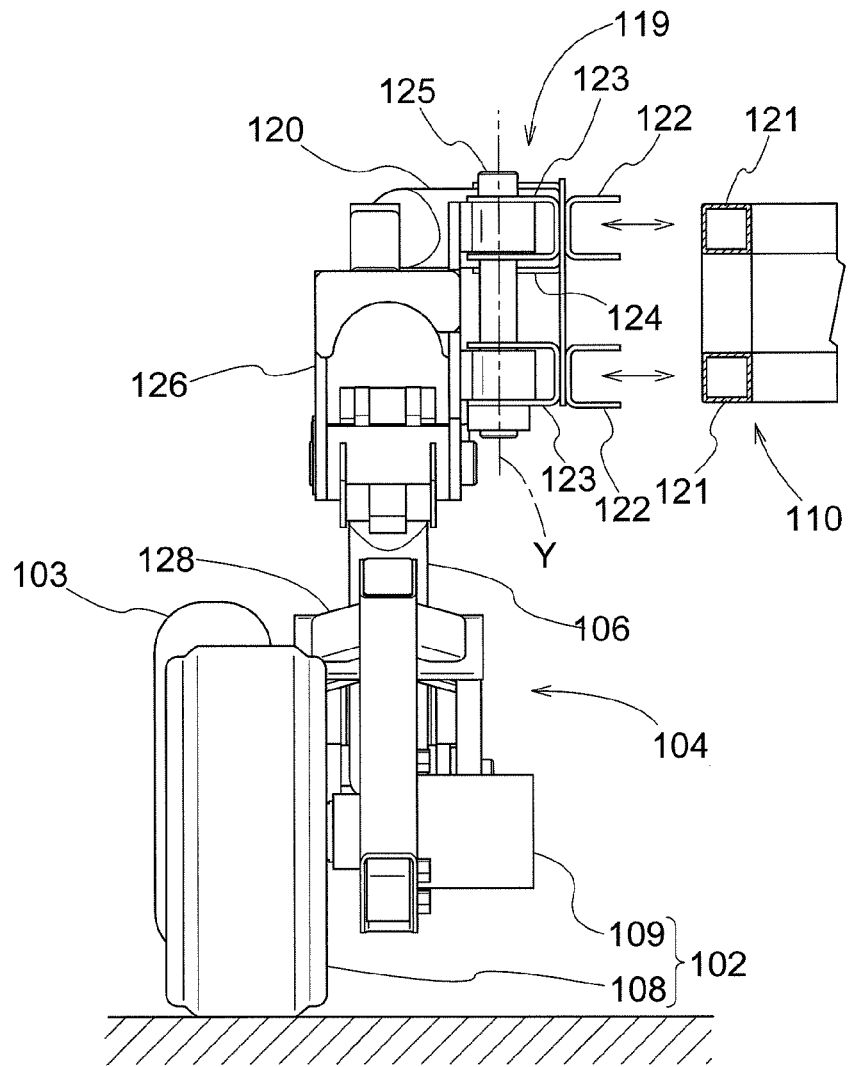
FIG. 22 is a front view showing an attachment state of the bending link mechanism under a removed state.
Figure 23:
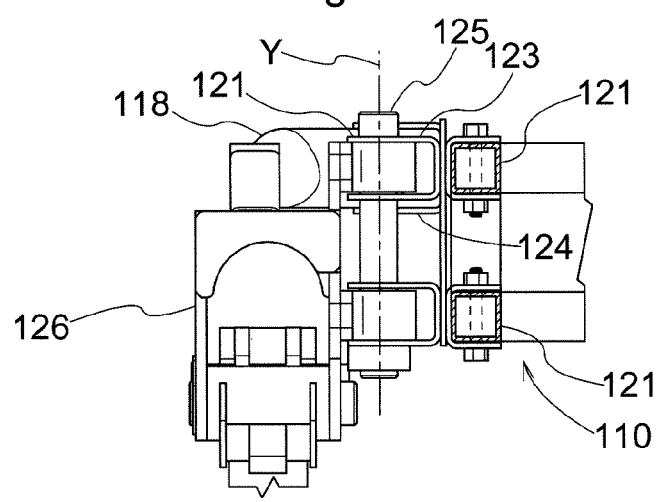
FIG. 23 is a front view showing an attachment state of the bending link mechanism under an attached state.

As shown in FIG. 21, the first link 127 includes a base end side arm portion 127b and an other end side arm portion 127a. At one end side portion of the first link 127, there is integrally formed the base end side arm portion 127b which extends obliquely outwardly upwards. At the other end side portion of the first link 127, there is integrally formed the other end side arm portion 127a which extends obliquely outwardly upwards.

Figure 20:
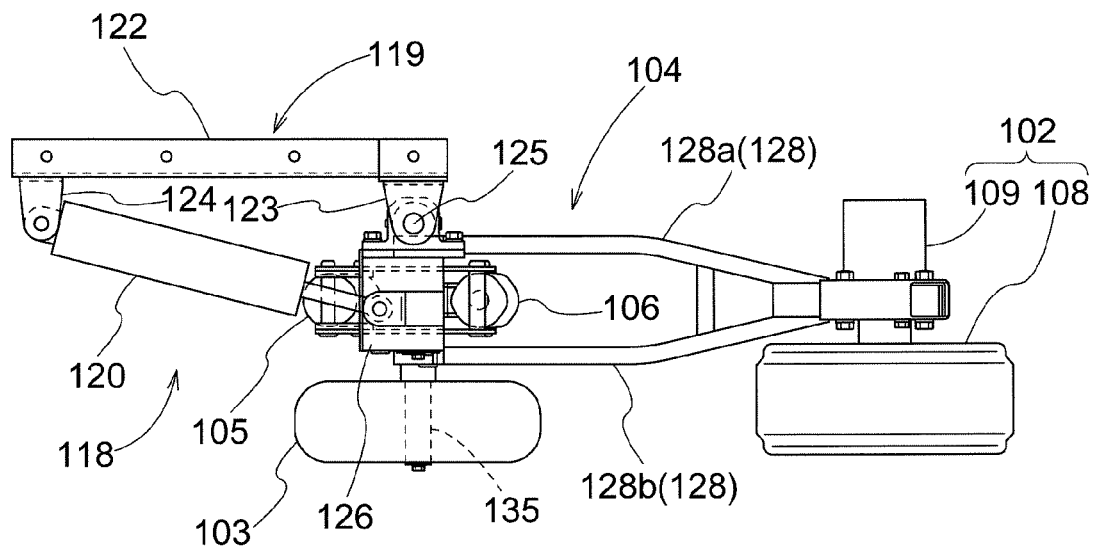
FIG. 20 is a plan view of a bending link mechanism.

As shown in FIG. 20, the second link 128 is bifurcated with a pair of right and left band-plate like plate bodies 128a, 128b, as seen in a plan view. The pair of plate bodies 128a, 128b keep the spacing distance from each other at the coupling portions of the second link 128 relative to the first link 127. At the area sandwiched by the pair of plate bodies 128a, 128b, a coupling pivot shaft 135 to be coupled with the first link 127 is pivotally supported. At the pivotal side end portion of the second link 128 opposite to the coupling portion thereof relative to the first link 127, the traveling device 102 is supported. As shown in FIG. 21, at the pivotal side end portion of the second link 128, there is formed an L-shaped extension portion 128A that extends in the form of an approximate L-letter in the direction away from the vehicle body 101; and at the extension end portion of this L-shaped extension portion 128A, the traveling device 102 is supported.

Each one of the plurality (four) of bending link mechanisms 104 includes the hydraulic cylinders 105, 106. As shown in FIG. 18 and FIG. 21, there are provided the first hydraulic cylinder 105 capable of changing the pivotal posture of the first link 127 relative to the vehicle body 101 and the second hydraulic cylinder 106 capable of changing the pivotal posture of the second link 128 relative to the first link 127. The first hydraulic cylinder 105 and the second hydraulic cylinder 106 are disposed in concentration in the vicinity of the first link 127 respectively.

The first link 127, the first hydraulic cylinder 105 and the second hydraulic cylinder 106 are disposed between the pair of plate bodies 128a, 128b of the second link 128 as seen in the plan view. As shown in FIGS. 20 and 21, the first hydraulic cylinder 105 is disposed on the vehicle body front/rear direction inner side relative to the first link 127 and provided along the longitudinal direction of the first link 127. The first hydraulic cylinder 105 has its one end portion operably coupled to a lower portion of the base end portion 126 via a first interlocking member 130 that is formed arcuate. One end portion of the first hydraulic cylinder 105 is operably coupled to a base end side portion of the first link 127 via a further/second interlocking member 131. The first interlocking member 130 and the second interlocking member 131 have respective opposed ends thereof pivotally coupled to each other. The other end portion of the first hydraulic cylinder 105 is operably coupled to the other end side arm portion 127a formed integrally in the first link 127.

The second hydraulic cylinder 106 is disposed on the opposite side to the first hydraulic cylinder 105, namely, on the vehicle body front/rear direction outer side relative to the first link 127 and provided along the longitudinal direction of the first link 127. One end portion of the second hydraulic cylinder 106 is operably coupled to the base end side arm portion 127b formed integrally in the base end side of the first link 127. The other end portion of the second hydraulic cylinder 106 is operably coupled to an arm portion 133 formed integrally in the base end side portion of the second link 128 via a third interlocking member 132. The other end portion of the second hydraulic cylinder 106 is operably coupled also to the pivotal end side portion of the first link 127 via a further/fourth interlocking member 134. The third interlocking member 132 and the fourth interlocking member 134 have respective opposed ends thereof pivotally coupled to be pivotable relative to each other.

If the first hydraulic cylinder 105 is expanded/contracted when the second hydraulic cylinder 106 is stopped, the first link 127, the second link 128 and the traveling device 102 respectively will be pivoted about the horizontal axis X1 at the pivotal coupling portion relative to the base end portion 126 with maintaining the relative postures thereof. If the second hydraulic cylinder 106 is expanded/contracted when the first hydraulic cylinder 105 is stopped, the second link 128 and the traveling device 102 will be pivoted together about a horizontal axis X2 at the coupling portion with the first link 127 and the second link 128 with maintaining the posture of the first link 127 relative to the vehicle body 101 constant.

As shown in FIG. 20, a coupling support shaft 135 that pivotally couples the first link 127 and the second link 128 to each other is formed to extend in such a manner to protrude to more outer side in the vehicle body lateral width direction than the second link 128. At the extension protruding portion of the coupling support shaft 135, the auxiliary wheel 103 is rotatably supported. Namely, the coupling support shaft 135 that pivotally couples the first link 127 and the second link 128 to each other is used also as the rotational support shaft for the auxiliary wheel 103, thus simplification of the arrangement through component co-utilization being sought for.

As shown in FIG. 20, the turning cylinder 120 has its one end portion pivotally coupled to the inner side pivot bracket 124 and the other end portion thereof pivotally coupled to a portion of the base end portion 126 laterally displaced relative to the pivotal support shaft 125.

Figure 24:
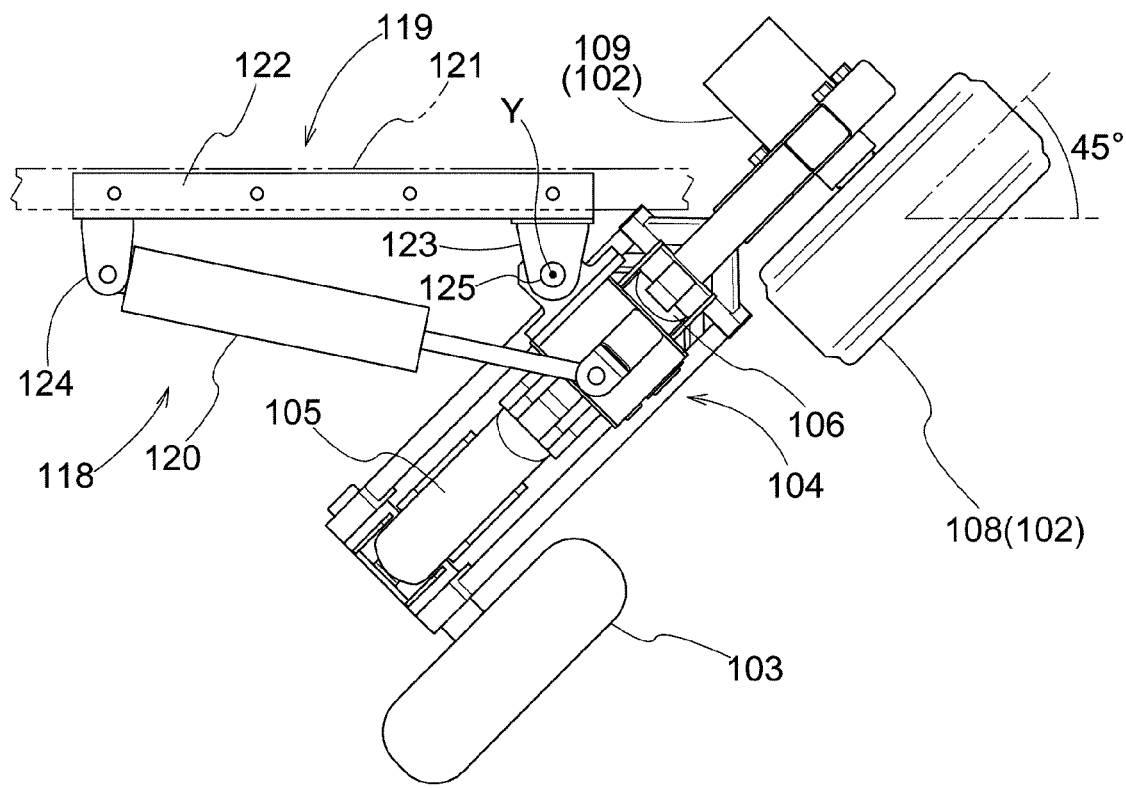
FIG. 24 is a plan view showing a left turning state by a turning mechanism.
Figure 25:
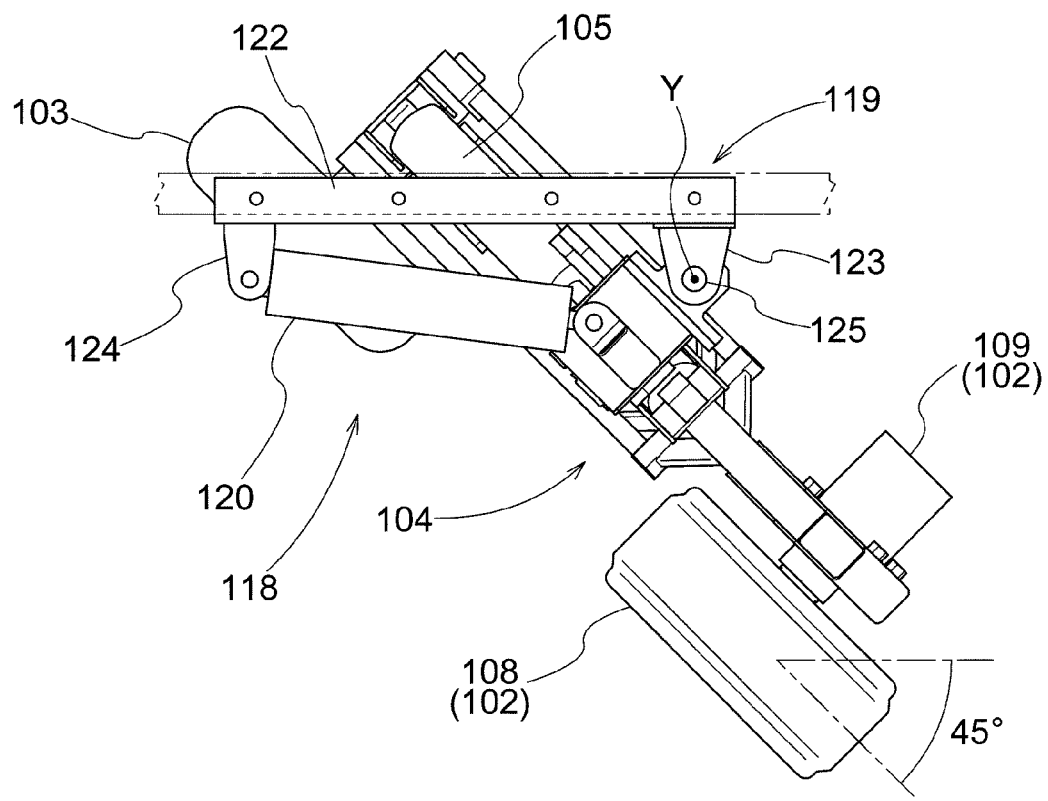
FIG. 25 is a plan view showing a right turning state by the turning mechanism.

As shown in FIG. 24 and FIG. 25, the bending link mechanism 104, the traveling device 102, the auxiliary wheel 103, and the hydraulic cylinders 105, 106 respectively are supported to the outer side pivot bracket 123 to be pivotable together about the vertical axis Y of the pivot support shaft 125. And, these will be pivotally operated together by expanding/contracting the turning cylinder 120. Turning operation is possible for each increment of 45 degrees from a straight traveling state in which the traveling device 102 is oriented in the front/rear direction to the left turning direction and the right turning direction, respectively.

If bolt coupling of the coupling member 122 to a front/rear oriented frame body 121 is released, it becomes possible to remove the turning mechanism 118, the bending link mechanism 104, the traveling device 102, the auxiliary wheel 103 and the hydraulic cylinders 105, 106 as being assembled to each other, from the vehicle body 1 altogether. Also, by bolt-coupling the coupling member 122 to the front/rear oriented frame body 121, it is possible to attach, the above respective devices, as being assembled together, to the vehicle body 1 altogether.

Work oil is fed from the work oil feeding device 107 to the first hydraulic cylinder 105 and the second hydraulic cylinder 106 of each one of the plurality of bending link mechanisms 104. With feeding/discharging of work oil, the first hydraulic cylinder 105 and the second hydraulic cylinder 106 can be expanded/contracted. The work oil feeding device 107 is controlled by the control device 117.

Also, with execution of flow rate adjustment of the work oil to the hydraulic motor 109, the rotational speed of the hydraulic motor 109, i.e. of the drive wheel 108, can be changed. The work oil feeding device 107 is controlled by the control device 117, based on control information inputted via a manual operation, control information set and stored in advance, etc.

As shown in FIG. 18, this work vehicle includes various sensors. Specifically, the work includes a first head side pressure sensor S1 and a first cap side (remote-from-head side) pressure sensor S2 included in the respective first hydraulic cylinder 105; and a second cap side pressure sensor S3 and a second head side (remote-from-cap side) pressure sensor S4 included in the respective second hydraulic cylinder 106. The first head side pressure sensor S1 detects an oil pressure of the head side chamber of the first hydraulic cylinder 105. The first cap side pressure sensor S2 detects an oil pressure of the cap side chamber of the first hydraulic cylinder 105. The second cap side pressure sensor S3 detects an oil pressure of the head side chamber of the second hydraulic cylinder 106. The second head side pressure sensor S4 detects an oil pressure of the cap side chamber of the second hydraulic cylinder 106. Further, though not shown, each hydraulic cylinder 105, 106 incorporates a stroke sensor capable of detecting an expansion/contraction stroke amount and is configured to feedback its operational state to the control device 117.

Incidentally, it is noted that the attachment positions of the respective pressure sensors S1, S2, S3, S4 are not limited to those described above. These respective pressure sensors S1, S2, S3, S4 need only to be capable of detecting (estimating) the oil pressure of the cap side chamber or the head side chamber corresponding thereto, thus may be disposed in a pipe extending from the valve mechanism to the corresponding cap side or head side chamber.

Based on detection results from these sensors, a force needed for supporting the vehicle body 101 is calculated and based on this result, feeding of work oil to the respective first hydraulic cylinder 105 and second hydraulic cylinder 106 will be controlled. Specifically, based on a detection value of the first head side pressure sensor S1 and a detection value of the first cap side pressure sensor S2, from a pressure difference between the cap side chamber and the head side chamber of the first hydraulic cylinder 105, a cylinder propelling force for the first hydraulic cylinder 105 will be calculated. Further, based on a detection value of the second cap side pressure sensor S3 and a detection value of the second head side pressure sensor S4, from a pressure difference between the cap side chamber and the head side chamber of the second hydraulic cylinder 106, a cylinder propelling force for the second hydraulic cylinder 106 will be calculated.

The vehicle body 101 includes an acceleration sensor S5 constituted of e.g. a triaxial acceleration sensor or the like. Based on a detection result of the acceleration sensor S5, tilts of the vehicle body 101 to the front/rear sides and right/left sides are detected. And, based on the result, the posture of the vehicle body 101 is controlled. Namely, in order to allow the posture of the vehicle body 101 to become a target posture, feeding of work oil to the respective first hydraulic cylinder 105 and second hydraulic cylinder 106 will be controlled.

The traveling device 102 includes a rotation sensor S6 for detecting a rotational speed of the drive wheel 108. In operation based on a rotational speed of the drive wheel 108 calculated by the rotation sensor S6, feeding of work oil to the hydraulic motor 109 will be controlled in such a manner that the rotational speed of the drive wheel 108 may become a target value.

As described above, the work vehicle according to the instant embodiment is configured such that the traveling devices 102 are supported via the respective bending link mechanisms 104 and also that the postures of the bending link mechanisms 104 are changed by the hydraulic cylinders 105, 106. Moreover, driving of traveling is done by the hydraulic motor 109 also. Therefore, the work vehicle is suitable for an agricultural work as being robust against adverse influence from water content, fine dust or the like, unlike an electric motor for instance.

Modified Embodiments of Second Embodiment (1) In the foregoing embodiment, both the first hydraulic pump 112 and the second hydraulic pump 113 are driven by the engine 111. In place of this arrangement, following arrangements are also possible.

As shown in FIG. 27, it is possible to arrange such that the first hydraulic pump 112 is driven by the engine 111 while the second hydraulic pump 113 is driven by an electric motor 140. In this arrangement, it may be configured such that pressure oil from the first hydraulic pump 112 is constantly fed to the plurality of hydraulic motors 109 and pressure oil from the second hydraulic pump 113 is constantly fed to the plurality of hydraulic cylinders 105, 106. In the case of this arrangement, when a posture change of the vehicle body is to be carried out under traveling stopped state, the change can be made with keeping the engine 111 stopped. Therefore, there can be obtained advantages in terms of noise reduction, fuel saving, etc.

Further, as shown in FIG. 28, it is also possible to arrange such that a state of feeding pressure oil from the first hydraulic pump to the plurality of hydraulic motors 109 and a state of feeding pressure oil from the second hydraulic pump 113 to the plurality of hydraulic motors 109 can be switched over. Namely, in this arrangement, the oil pressure control unit 114 will be provided with a flow passage switching mechanism 141 (an example of "oil passage switching device") in the pressure oil passage extending from the first hydraulic pump 112 and in the pressure oil passage extending from the second hydraulic pump 113, whereby the state of feeding pressure oil from the first hydraulic pump 112 to the plurality of hydraulic motors 109 and the state of feeding pressure oil from the second hydraulic pump 113 to the plurality of hydraulic motors 109 can be switched over.

With this arrangement, for instance, in the case of traveling on a rough road having considerable unevenness, the case of traveling for an extended period of time, the case of traveling at a high speed, etc., stable traveling is possible with feeding the pressure oil from the first hydraulic pump 112 driven by the engine 111 to the plurality of hydraulic motors 109. On the other hand, for instance, in the case of small change in the posture of the vehicle body 101 is desired, the case of loading or unloading the work vehicle onto/from a driven vehicle or the like or the case of traveling at an extremely low speed, there can be obtained e.g. an advantage that fine adjustment can be readily made by feeding the pressure oil from the second hydraulic pump 113 driven by the electric motor 140 to the plurality of hydraulic motors 109.

(2) In the foregoing embodiment, the bending link mechanism 104 as a "vehicle body supporting portion" includes two links (first link 127 and second link 128). The invention is not limited thereto. It may comprise an articulated link mechanism with three or more links pivotally coupled to each other. Further, the vehicle body supporting portion needs only to be capable of supporting each traveling device to the vehicle body with allowing height position adjustment relative thereto. Thus, in place of the articulated link mechanism, it may be embodied in various modes such as an arrangement in which only pivotal link is supported, an arrangement in which the drive wheel is supported by a hydraulic cylinder to the vehicle body to be vertically movable relative thereto.

(3) In the foregoing embodiment, in the first hydraulic cylinder 105, its cylinder tube side is pivotally coupled to the vehicle body side coupled portion (base end portion 126) and its piston side is pivotally coupled to the first link side coupled portion (arm portion 133). In place of this arrangement, the first hydraulic cylinder 105 may be arranged such that its cylinder tube side is pivotally coupled to the first link side coupled portion (arm portion 133) and its piston rod side is pivotally coupled to the vehicle body side coupled portion (base end portion 126).

(4) In the foregoing embodiment, the traveling device 102 includes one drive wheel 108. In place of this arrangement, it may be arranged such that the traveling device 102 comprises a crawler traveling device having a crawler belt wound around a plurality of wheel bodies.

(5) In the foregoing embodiment, the traveling devices 102 are provided one pair on the right and left sides on front/rear opposed sides of the vehicle body 101. Instead, it is possible to provide three traveling devices 102 or five or more traveling devices 102.

(6) In the foregoing embodiment, a four-leg, four-wheel robot of hydraulic electronic control type was used as an example of "work vehicle". However, the present invention is not limited to the modes shown in the drawings.

DESCRIPTION OF REFERENCE NUMERALS/MARKS

Corresponding to First Embodiment

1: vehicle body
2: traveling device
4: bending link mechanism (articulated link mechanism)
5: first hydraulic cylinder
5A: cylinder tube
5B: piston rod
6: second hydraulic cylinder
7: work oil feeding device (hydraulic oil source)
12: turning mechanism
21: first link
22: second link
32: hydraulic hose (work oil feeding tube)
33: work oil relaying device (feeding tube holding portion)

Corresponding to Second Embodiment

101: vehicle body
102: traveling device
104: bending link mechanism (vehicle body supporting portion, articulated link mechanism)
105, 106: hydraulic cylinder
109: hydraulic motor
111: engine
112: first hydraulic pump
113: second hydraulic pump
140: electric motor
141: passage switching mechanism (oil passage switching device)

What is claimed is:

1. A work vehicle comprising:
a vehicle body;
a plurality of traveling devices driven for traveling;
a plurality of articulated link mechanisms having a plurality of links pivotally coupled to each other to provide two or more joints and configured to independently support the traveling devices to the vehicle body with allowing lifting/lowering of the traveling devices independently relative to the vehicle body; and
a plurality of hydraulic cylinders capable of changing respective postures of the plurality of links included in the articulated link mechanisms;
wherein a first link, located at a position closest to the vehicle body in the plurality of links, is supported to be pivotable about a body side coupling portion,
wherein a first hydraulic cylinder included in the plurality of hydraulic cylinders and used for operating the first link is configured to pivotally operate the first link, in association with an expansion/contraction operation thereof associated with feeding of work oil thereto from an oil source included in the vehicle body,
wherein a cylinder tube side of the first hydraulic cylinder is pivotally coupled to a coupled portion on the side of the vehicle body, and a piston rod side of the first hydraulic cylinder is pivotally coupled to a coupled portion on the side of the first link,
wherein there is provided a plurality of turning mechanisms configured to support the plurality of articulated link mechanisms respectively to the vehicle body, the plurality of turning mechanisms being also configured to allow the changing of the respective postures of the plurality of links about a vertical axis, and
wherein:
the articulated link mechanism is disposed more laterally outward than a laterally outer end of the vehicle body;
as seen in a plan view, the turning mechanism is disposed between the vehicle body and the articulated link mechanism; and
adjacent the turning mechanism, there is provided a feeding pipe holding portion for holding in position a work oil feeding pipe for feeding the work oil from the oil source to the plurality of hydraulic cylinders.

2. A work vehicle comprising:
a vehicle body;
a plurality of traveling devices driven for traveling;
a plurality of vehicle body supporting portions for supporting the plurality of traveling devices with allowing changes in height positions thereof relative to the vehicle body independently;
a plurality of hydraulic motors for driving the plurality of traveling devices respectively;
a plurality of hydraulic cylinders capable of changing postures of the plurality of vehicle body support portions respectively;
a first hydraulic pump for feeding pressure oil to the plurality of hydraulic motors; and
a second hydraulic pump for feeding pressure oil to the plurality of hydraulic cylinders,
wherein the first hydraulic pump is driven by an engine, and the second hydraulic pump is driven by an electric motor.

3. The work vehicle as defined in claim 2, wherein there is provided an oil passage switching device capable of switching over between a state of pressure oil from the first hydraulic pump being fed to the plurality of hydraulic motors, and a state of pressure oil from the second hydraulic pump being fed to the plurality of hydraulic cylinders.

4. The work vehicle as defined in claim 2, wherein the plurality of vehicle body supporting portions comprise an articulated link mechanism having a plurality of links pivotally coupled to provide at least two joints and configured to support the vehicle body with allowing lifting/lowering of the plurality of traveling devices.

5. A work vehicle comprising:
a vehicle body;
a plurality of traveling devices driven for traveling, the traveling devices being provided on front and rear sides on each of right and left sides of the vehicle body;
a plurality of articulated link mechanisms having a plurality of links pivotally coupled to each other to provide two or more joints and configured to independently support the traveling devices to the vehicle body with allowing lifting/lowering of the traveling devices independently relative to the vehicle body; and
a plurality of hydraulic cylinders capable of changing respective postures of the plurality of links included in the articulated link mechanisms,
wherein each of the plurality of hydraulic cylinders includes: a first hydraulic cylinder capable of changing a pivotal posture of a first link relative to the vehicle body and a second hydraulic cylinder capable of changing a pivotal posture of a second link relative to the first link,
wherein a cylinder tube side of the first hydraulic cylinder is pivotally coupled to a coupled portion on the side of the vehicle body, and a piston rod side of the first hydraulic cylinder is pivotally coupled to a coupled portion on the side of the first link, and
wherein a cylinder tube side of the second hydraulic cylinder is pivotally coupled to a coupled portion of the first link on the side of the vehicle body, and a piston rod side of the second hydraulic cylinder is pivotally coupled to a coupled portion of the first link on the opposite side to the vehicle body.

6. The work vehicle as defined in claim 5, wherein a plurality of turning mechanisms are provided, the plurality of turning mechanisms being configured to support the plurality of articulated link mechanisms respectively to the vehicle body and configured to allow the changing of the respective postures of the plurality of links about a vertical axis.

7. The work vehicle as defined in claim 6, wherein:
the articulated link mechanism is disposed more laterally outward than a laterally outer end of the vehicle body;
as seen in a plan view, the turning mechanism is disposed between the vehicle body and the articulated link mechanism; and
adjacent the turning mechanism, there is provided a feeding pipe holding portion for holding in position a work oil feeding pipe for feeding work oil from an oil source to the plurality of hydraulic cylinders.

* * * * *